(12) United States Patent
Zhang et al.

(10) Patent No.: US 11,102,789 B2
(45) Date of Patent: Aug. 24, 2021

(54) TRANSMISSION OF PHASE TRACKING REFERENCE SIGNALS (PT-RS)

(71) Applicant: APPLE INC., Cupertino, CA (US)

(72) Inventors: Yushu Zhang, Beijing (CN); Yuhang Guo, Beijing (CN); Gang Xiong, Portland, OR (US); Hua Li, Beijing (CN); Yuan Zhu, Beijing (CN)

(73) Assignee: APPLE INC., Cupertino, CA (US)

( * ) Notice: Subject to any disclaimer, the term of this patent is extended or adjusted under 35 U.S.C. 154(b) by 273 days.

(21) Appl. No.: 16/323,465

(22) PCT Filed: Aug. 7, 2017

(86) PCT No.: PCT/US2017/045748
§ 371 (c)(1),
(2) Date: Feb. 5, 2019

(87) PCT Pub. No.: WO2018/027222
PCT Pub. Date: Feb. 8, 2018

(65) Prior Publication Data
US 2021/0076389 A1 Mar. 11, 2021

(30) Foreign Application Priority Data
Aug. 5, 2016 (WO) ................ PCT/CN2016/093587

(51) Int. Cl.
*H04W 72/08* (2009.01)
*H04L 5/00* (2006.01)
*H04W 72/04* (2009.01)

(52) U.S. Cl.
CPC ......... *H04W 72/082* (2013.01); *H04L 5/0048* (2013.01); *H04W 72/048* (2013.01); *H04W 72/0413* (2013.01); *H04W 72/085* (2013.01)

(58) Field of Classification Search
CPC .......... H04W 72/082; H04W 72/0413; H04W 72/048; H04W 72/085; H04L 5/0048
See application file for complete search history.

(56) References Cited

U.S. PATENT DOCUMENTS

2008/0101492 A1    5/2008  Gregoire et al.
2017/0294926 A1   10/2017  Islam et al.
(Continued)

FOREIGN PATENT DOCUMENTS

WO        2016/0000915 A1    1/2016

OTHER PUBLICATIONS

3GPP TS 36.211 V12.4.0; Evolved Universal Terrestrial Radio Access (E-UTRA); Physical channels and modulation (Release 12); Valbonne—France (Dec. 2014).
(Continued)

*Primary Examiner* — Marisol Figueroa

(57) ABSTRACT

Technology for a user equipment (UE) operable to decode a resource mapping pattern of a phase tracking reference signal (PT-RS) received from a base station in a wireless network is disclosed. The UE can decode control signaling received in a downlink from the base station. The control signaling can indicate a resource mapping pattern for a PT-RS. The UE can identify the resource mapping pattern for the PT-RS based on the control signaling received from the base station. The UE can encode one or more PT-RS for transmission to the base station in an uplink in accordance with the resource mapping pattern for the PT-RS.

16 Claims, 22 Drawing Sheets

(56) References Cited

U.S. PATENT DOCUMENTS

2018/0041321 A1     2/2018  Guo et al.
2019/0222385 A1*    7/2019  Hessler ................ H04L 5/0094
2020/0235979 A1*    7/2020  Yokomakura ....... H04L 27/2636

OTHER PUBLICATIONS

U.S. Appl. No. 16/408,003, Non-Final Office Action, dated Aug. 24, 2020, 20 pages.
U.S. Appl. No. 16/408,003, Non-Final Office Action, dated Apr. 20, 2021, 15 pages.

* cited by examiner

TRANSMISSION OF PHASE TRACKING REFERENCE SIGNALS (PT-RS)

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE) Release 8, 9, 10, 11, 12 and 13, the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1A:
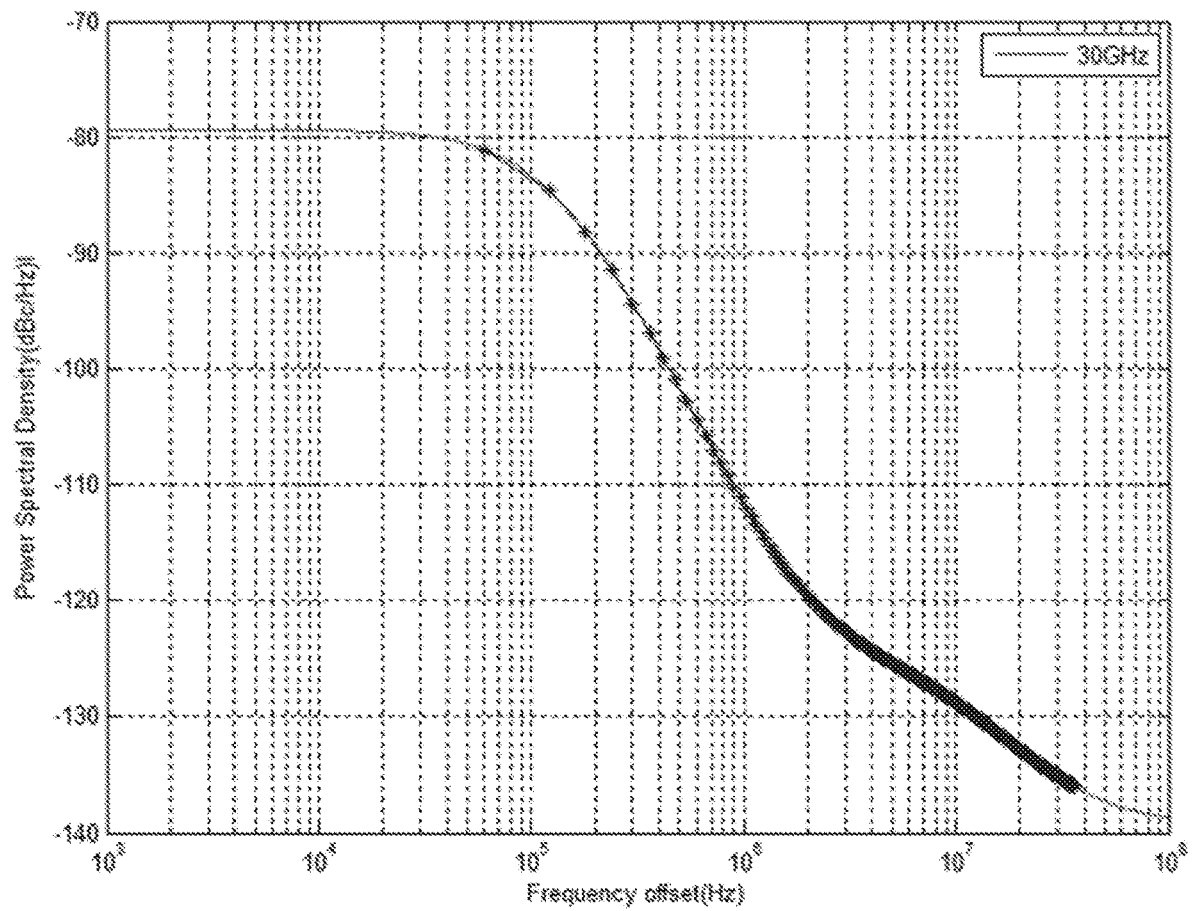
FIGS. 1A and 1B illustrate a phase noise power spectral density and its impact on a 64 quadrature amplitude modulation (64 QAM) constellation in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

For Fifth Generation (5G) wireless communication systems that operate in the millimeter-wave range, a phase noise level of a "total" oscillator used can be higher than that of traditional wireless communication systems in an ultra-high frequency (UHF) and microwave bands. Here, the phase noise level of the "total oscillator" used can include a reference clock, a loop filter, and other phased-locked loop (PLL) components. For example, a phase noise can increase based on an increase of a carrier frequency. As a result, the performance of 5G wireless communication systems operating in the millimeter-wave range can be limited by phase noise when appropriate compensation mechanisms are not employed.

Figure 1B:
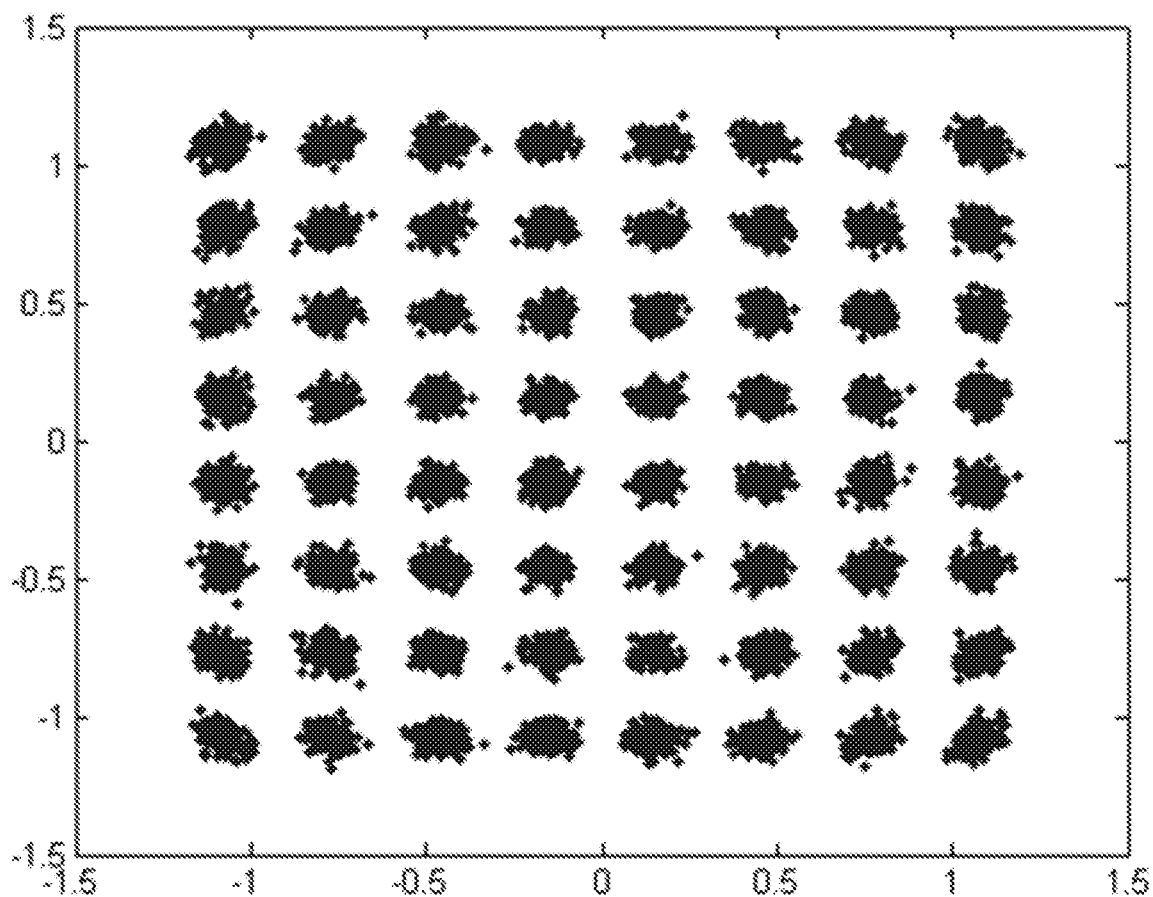

FIGS. 1A and 1B illustrate an example of a phase noise power spectral density and its impact on a 64 quadrature amplitude modulation (64 QAM) constellation. As shown, a phase noise level can increase by approximately 20 decibels relative to the carrier per hertz (dBc/Hz) per decade of increase of a carrier frequency, which can degrade the performance of 5G wireless communication systems operating in the millimeter-wave range, especially when appropriate compensation mechanisms are not utilized.

In one configuration, appropriate techniques to track and compensate the phase noise can be needed. For example, since phase noise can appear as phase rotations of signal samples in a time domain and because a bandwidth of a phase noise process is narrow (i.e., the phase noise is a time correlated process), time domain reference signals can be used to track and compensate the phase noise process. These time domain reference signals used to track and compensate the phase noise can be referred to as phase tracking reference signals (PT-RS). For example, these time domain reference signals can be used to measure a phase offset of the time domain reference signals, thereby providing a significant benefit to the 5G wireless communication systems operating in the millimeter-wave range. The PT-RS can be transmitted from a UE to a base station in an uplink, or alternatively, the PT-RS can be transmitted from the base station to the UE in a downlink. A receiver that receives the PT-RS (e.g., the UE or base station) can measure the phase offset of the PT-RS, and compensate for the phase offset when performing a channel estimation.

Figure 2:
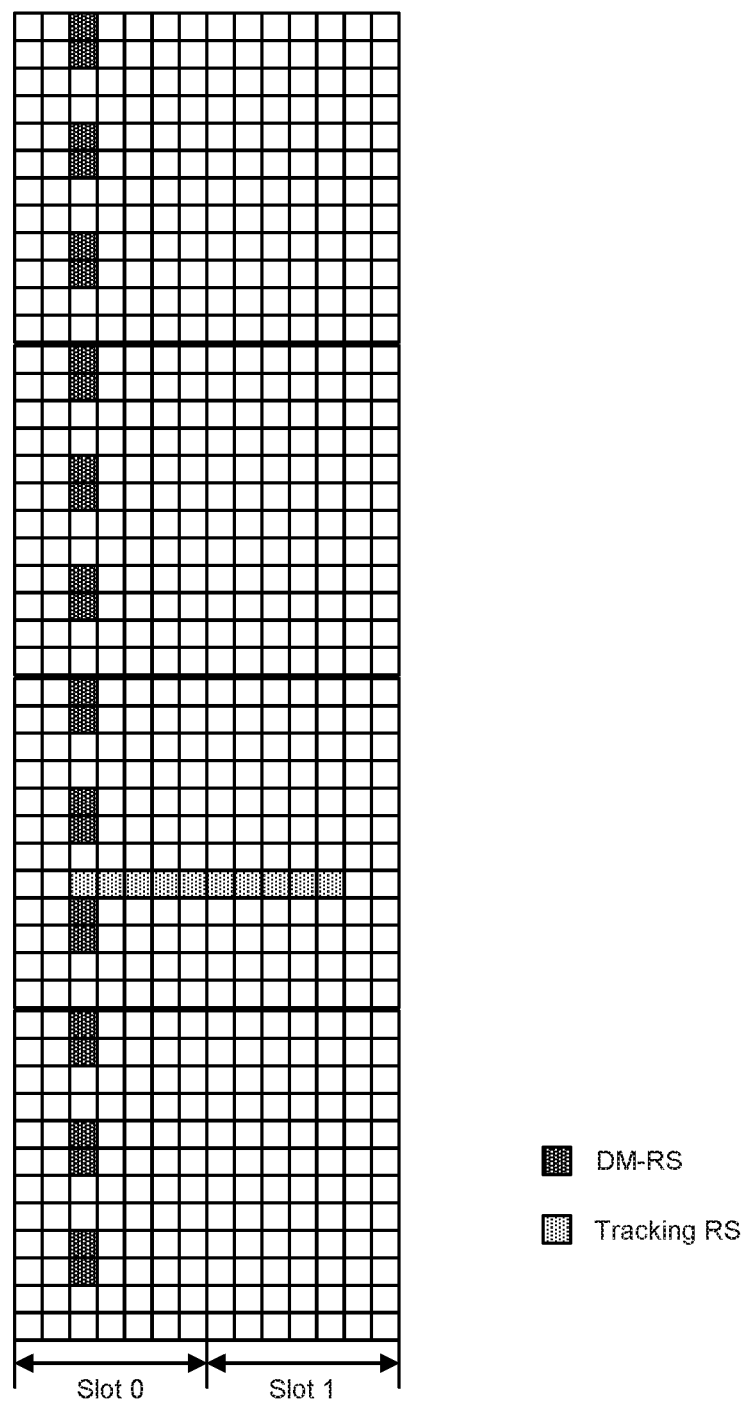
FIG. 2 illustrates a first phase tracking reference signal (PT-RS) pattern (a PT-RS pattern 1) in accordance with an example.

FIG. 2 illustrates an exemplary phase tracking reference signal (PT-RS) pattern (or PT-RS pattern 1). In this example, a first OFDM symbol of a shared Channel (SCH) can be allocated for demodulation reference signals (DM-RS). For a single port, the PT-RS can span one subcarrier in every N physical resource blocks (e.g., N=4), wherein N is an integer. In addition, a PT-RS transmission duration can be the same as a data channel duration.

In a first scenario (e.g., a high signal-to-noise (SNR) scenario or a high signal-to-interference-plus-noise ratio (SINR) scenario), the phase noise can be a dominant factor in a wireless communication system, whereas in a second scenario (e.g., a low SNR scenario or a low SINIR scenario), a noise and Doppler frequency offset can be the dominant factor in the wireless communication system. The PT-RS pattern 1 (as shown above) may not perform well in low SNR scenarios, especially when a UE is scheduled with N PRBs, as a channel estimation error for the PT-RS can be increased. Therefore, an adaptive PT-RS pattern can be beneficial to adapt to difference types of scenarios, In one configuration, an adaptive PT-RS pattern and control signaling for the adaptive PT-RS pattern can be utilized to enable a more robust PT-RS for difference types of scenarios, such as the first scenario (e.g., a high SNR scenario or a phase noise limited scenario), which indicates that phase noise is the dominant factor affecting the wireless communication system, or the second scenario (e.g., a low SNR scenario or a noise and Carrier Frequency Offset (CFO) limited scenario), which indicates that CFO is the dominant factor affecting the wireless communication system. The control signaling for the adaptive PT-RS pattern can be transmitted from the base station, and the UE (or the base station) can transmit PT-RS in accordance with the adaptive PT-RS pattern.

In past solutions, the PT-RS pattern 1 (as shown above) was effective in scenarios in which the phase noise was the dominant impact in the wireless communication system (e.g., a high SNR scenario). However, as compared to the PT-RS pattern 1, a novel PT-RS pattern (e.g., a PT-RS pattern 2, as further explained below) can provide improved performance in low SNR scenarios for both a high UE speed (e.g., 50 km/hour) and a low UE speed (e.g., 3 km/hour), when the noise and Doppler frequency offset can be the dominant factor.

In one configuration, an adaptive PT-RS pattern and its control signaling can be utilized that incorporates both the PT-RS pattern 1 and the PT-RS pattern 2, which can enable a more robust PT-RS for different kinds of scenarios (e.g., the high SNR scenario or the low SNR scenarios for both high UE speed and low UE speed), thereby providing additional flexibility and improved performance for the wireless communication system.

In one example, for the high SNR scenario in which the phase noise is the dominant factor affecting the wireless communication system, the PT-RS pattern 1 can be used to compensate for a phase rotation, and then a receiver (e.g., a UE or base station) can estimate a channel in symbols where a demodulation reference signal (DMRS) is not allocated. However, for the low SNR scenario in which the noise and CFO is the dominant factor affecting the wireless communication network, a density of the PT-RS pattern 1 can be insufficient, such that some channel estimation loss can be observed for the PT-RS. Therefore, it can be advantageous to use a PT-RS pattern (e.g., a PT-RS pattern 2, as described further below) other than the PT-RS pattern 1 for the low SNR scenario.

Figure 3:
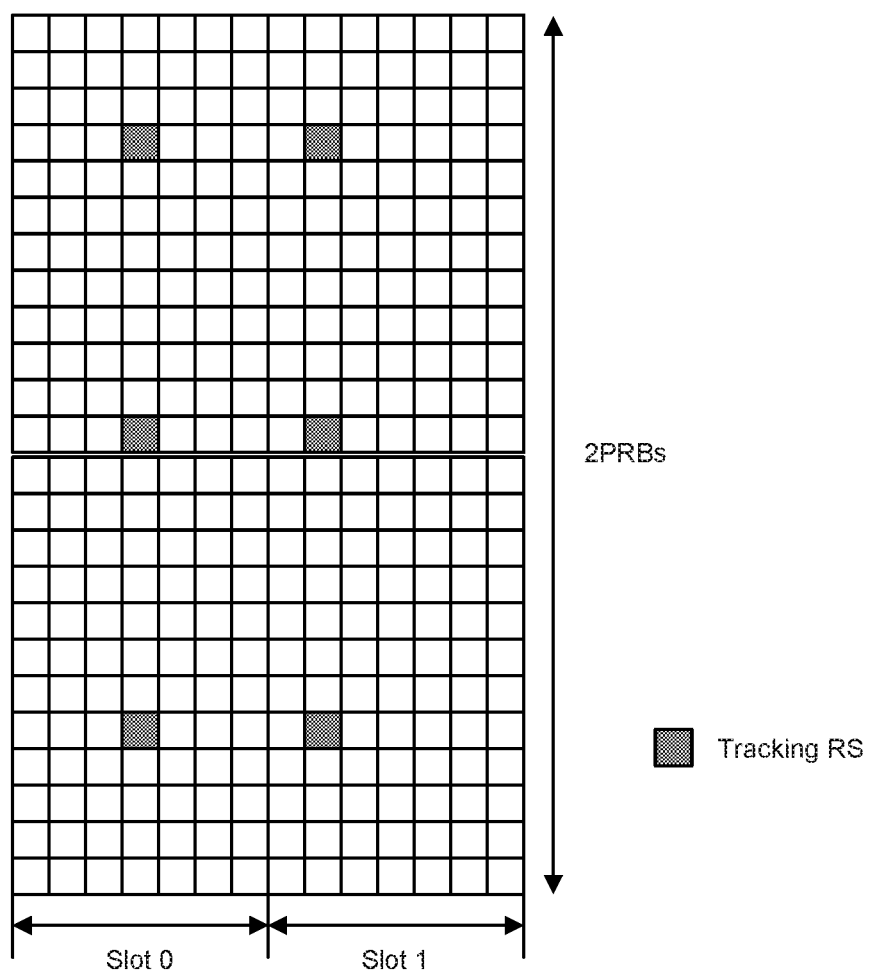
FIG. 3 illustrates another phase tracking reference signal (PT-RS) pattern (e.g., a PT-RS pattern 2) in accordance with an example.

FIG. 3 illustrates an exemplary phase tracking reference signal (PT-RS) pattern (or PT-RS pattern 2). In one example, multiple predefined PT-RS patterns can be defined for the wireless communication system. For example, in a first PT-RS pattern, the PT-RS can be presented in each symbol and one PT-RS can be used in every N PRBs, e.g., N=4. In a second PT-RS pattern (e.g., the PT-RS pattern 2, as shown in FIG. 3), the PT-RS can be used in a symbol after the DMRS symbols and another symbol in a second slot. In the second PT-RS pattern, a frequency domain density for the PT-RS can be one PT-RS in M subcarriers, e.g., M=6.

In one configuration, a base station can determine a resource mapping pattern for the PT-RS. The base station can transmit control signaling to the UE. The control signaling can indicate the resource mapping pattern for the PT-RS. The base station can receive one or more PT-RS from the UE in an uplink in accordance with the resource mapping pattern for the PT-RS. In one example, the base station can compensate for a phase rotation based on the one or more PT-RS received from the UE in the uplink in accordance with the resource mapping pattern for the PT-RS. The base station can estimate a channel quality of a channel between the base station and the UE after the phase rotation is compensated based on the one or more PT-RS received from the UE. In another example, the base station can send the resource mapping pattern for the PT-RS to the UE via higher layer signaling or RRC signaling. In yet another example, the base station can transmit the resource mapping pattern for the PT-RS to the UE via an enhanced master information block (xMIB) or an enhanced system information block (xSIB).

In one example, the base station can transmit the resource mapping pattern for the PT-RS to the UE via DCI, wherein the DCI includes one or more values to indicate different resource mapping patterns for the PT-RS. In another example, the base station can determine the resource mapping pattern for the PT-RS based on a modulation and coding scheme (MCS) utilized by the base station. In yet another example, the base station can determine the resource mapping pattern for the PT-RS with a subcarrier offset that is based on a cell identity (ID) or a virtual cell ID. In addition, the PT-RS for one antenna port can span one subcarrier every N PRBs, wherein N is an integer that is semi-statically or dynamically adjusted according to a UE capability or a use case, wherein the use case is dependent on one or more of: a MCS, an allocated bandwidth or a subcarrier spacing.

In one configuration, the UE can receive control signaling in a downlink from the base station. The control signaling can indicate the resource mapping pattern for the PT-RS. The UE can identify the resource mapping pattern for the PT-RS based on the control signaling received from the base station. The UE can receive one or more PT-RS from the base station in a downlink in accordance with the resource mapping pattern for the PT-RS. In one example, the UE can compensate for a phase rotation based on the one or more PT-RS received from the base station in the downlink in accordance with the resource mapping pattern for the PT-RS. The UE can estimate a channel quality of a channel between the UE and the base station after the phase rotation is compensated based on the one or more PT-RS received from the base station.

In one example, the UE can transmit the PT-RS to the base station in an uplink based on the adaptive PT-RS pattern received from the base station. Alternatively, the base station can transmit the PT-RS to the UE in a downlink based on the adaptive PT-RS pattern configured by the base station. In other words, the uplink and the downlink can be symmetric in terms of transmitting the PT-RS based on the adaptive PT-RS pattern. In other example, phase rotation compensation and channel quality estimation can be performed at a receiver (e.g., the UE or the base station). The receiver (e.g., the UE or the base station) can receive the PT-RS and then measure the phase offset of the PT-RS. In the downlink, the phase rotation compensation and channel quality estimation can be performed at the UE, whereas in the uplink, the phase rotation compensation and channel quality estimation can be performed at the base station.

In one configuration, a UE can receive control signaling in a downlink from the base station. The control signaling can indicate to the UE a resource mapping pattern for the PT-RS. The UE can identify the resource mapping pattern for the PT-RS based on the control signaling received from the base station. The UE can transmit one or more PT-RS to the base station in an uplink in accordance with the resource mapping pattern for the PT-RS. In one example, the UE can select a resource mapping pattern for the PT-RS from a set of resource mapping patterns for the PT-RS that are predefined at the UE, wherein the resource mapping pattern for the PT-RS is selected based on the control signaling received from the base station. In another example, the UE can receive the resource mapping pattern for the PT-RS from the base station via a higher layer signaling or a radio resource control (RRC) signaling. In yet another example, the UE can receive the resource mapping pattern for the PT-RS from the base station via DCI, wherein the DCI includes one or more values to indicate different resource mapping patterns for the PT-RS. In a further example, different resource mapping patterns for the PT-RS can create different time and frequency densities of the PT-RS. In yet a further example, the resource mapping pattern for the PT-RS can indicate that there is no PT-RS transmission from the UE. In addition, the resource mapping pattern for the PT-RS can be an adaptive pattern that is configured by the base station based on a presence of a phase noise limited scenario in the wireless network or a noise and CFO limited scenario in the wireless network. The phase noise limited scenario can indicate that phase noise is the dominant factor affecting a wireless network and the CFO limited scenario can indicate that CFO is the dominant factor affecting the wireless network.

In one example, downlink control information (DCI) transmitted from a base station to a UE can include an indicator of the PT-RS pattern, which can be useful for adjusting the PT-RS pattern being used in the wireless communication system. For example, the indicator can be a 1-bit value, in which a first value can indicate that the PT-RS pattern 1 is used (as shown in FIG. 2), and a second value can indicate that the PT-RS pattern 2 is used (as shown in FIG. 3). In another example, the indicator can be 2 bits, where a first value can indicate that no PT-RS is used, a second value can indicate that the PT-RS pattern 1 is used, and a third value can indicate that the PT-RS pattern 2 is used.

In one example, the PT-RS pattern can be configured via semi-statically by high layer signaling from the base station to the UE. Alternatively, the PT-RS can be configured by the base station using a combination of DCI and high layer signaling. For example, a higher layer can define a subset of PT-RS patterns, and the DCI may be used to indicate to the UE which PT-RS pattern is used from the subset of PT-RS patterns. In another example, the PT-RS for one antenna port can span one subcarrier every N PRBs, wherein N can be semi-statically or dynamically adjusted according to a UE capability or based on a use case.

Figure 4:
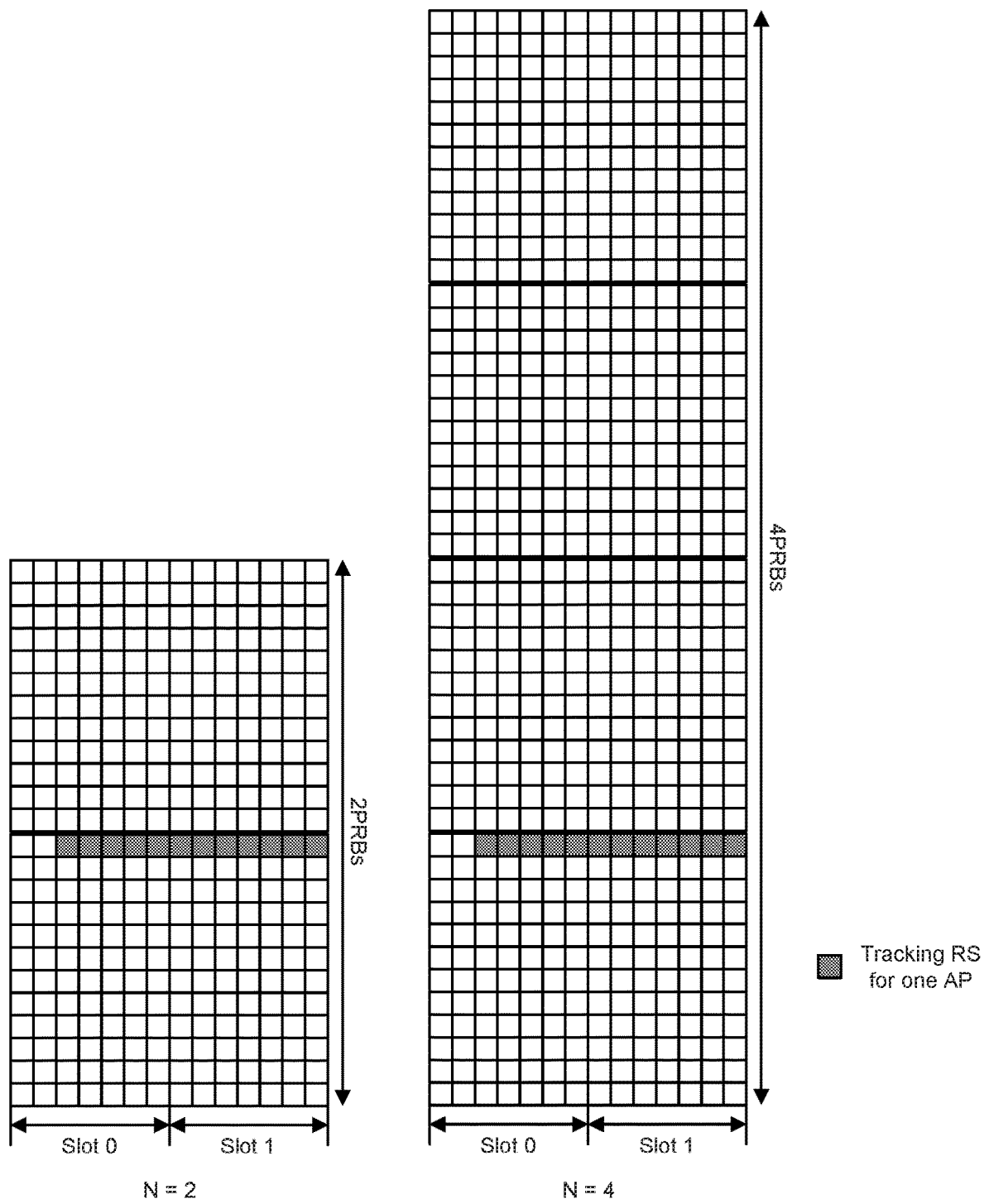
FIG. 4 illustrates a phase tracking reference signal (PT-RS) pattern for one antenna port (AP) when a number (N) of physical resource blocks (PRBs) is equal to 2 and 4 in accordance with an example.

FIG. 4 illustrates an exemplary phase tracking reference signal (PT-RS) pattern for one antenna port (AP) when a number (N) of physical resource blocks (PRBs) is equal to 2 and 4. In another example, N can be 2, 4 or 8. As shown, a nest structure can be defined for the PT-RS pattern with different densities. A same subcarrier can be allocated for the PT-RS for every N PRBs. This nest structure can improve a decoding performance for multi user multiple-input multiple-output (MU-MIMO), especially when considering the partial overlapping of resource allocation for multiple UEs.

In one example, the nest structure can be extended to a multiple APs case. For instance, when two APs are defined for the PT-RS for N=4, a same subcarrier can be allocated for the PT-RS for N=2 and N=4. In other words, one AP for the PT-RS in N=2 can be defined as another AP for the PT-RS in N=4.

Figure 5:
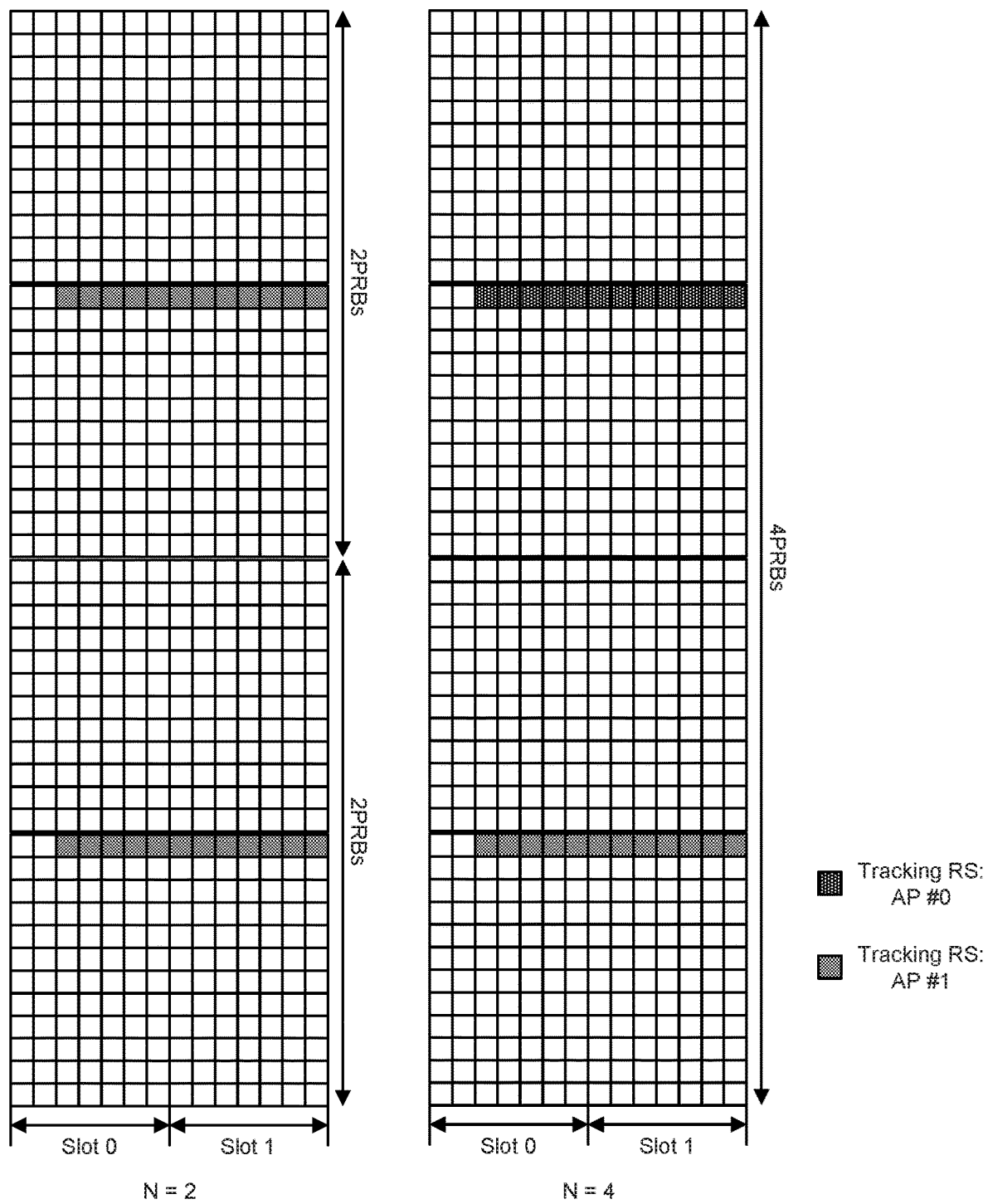
FIG. 5 illustrates a phase tracking reference signal (PT-RS) pattern for two antenna ports (APs) when a number (N) of physical resource blocks (PRBs) is equal to 2 and 4 in accordance with an example.

FIG. 5 illustrates an exemplary phase tracking reference signal (PT-RS) pattern for two antenna ports (APs) when a number (N) of physical resource blocks (PRBs) is equal to 2 and 4. In this example, a nest structure can be utilized for N=2 and 4. In particular, two APs (e.g., AP #0 and #1) can be defined for the PT-RS for N=4. A same subcarrier for PT-RS AP #1 for N=2 can be used for PT-RS AP #0 for N=4.

In one example, a PT-RS density can be semi-statically configured by higher layers via a 5G master information block (xMIB) or a 5G system information block (xSIB) transmitted from a base station. Alternatively, the PT-RS density can be configured via RRC signaling from the base station, or dynamically indicated in DCI transmitted from the base station. In one example, since a delay spread can be different when different transmit (Tx) or receive (Rx) beams are applied, the PT-RS density can be beam specific. In another example, K PT-RS density indicators can be configured by higher layers, where K is a number of beams maintained for one UE, e.g. K=4.

Figure 6:
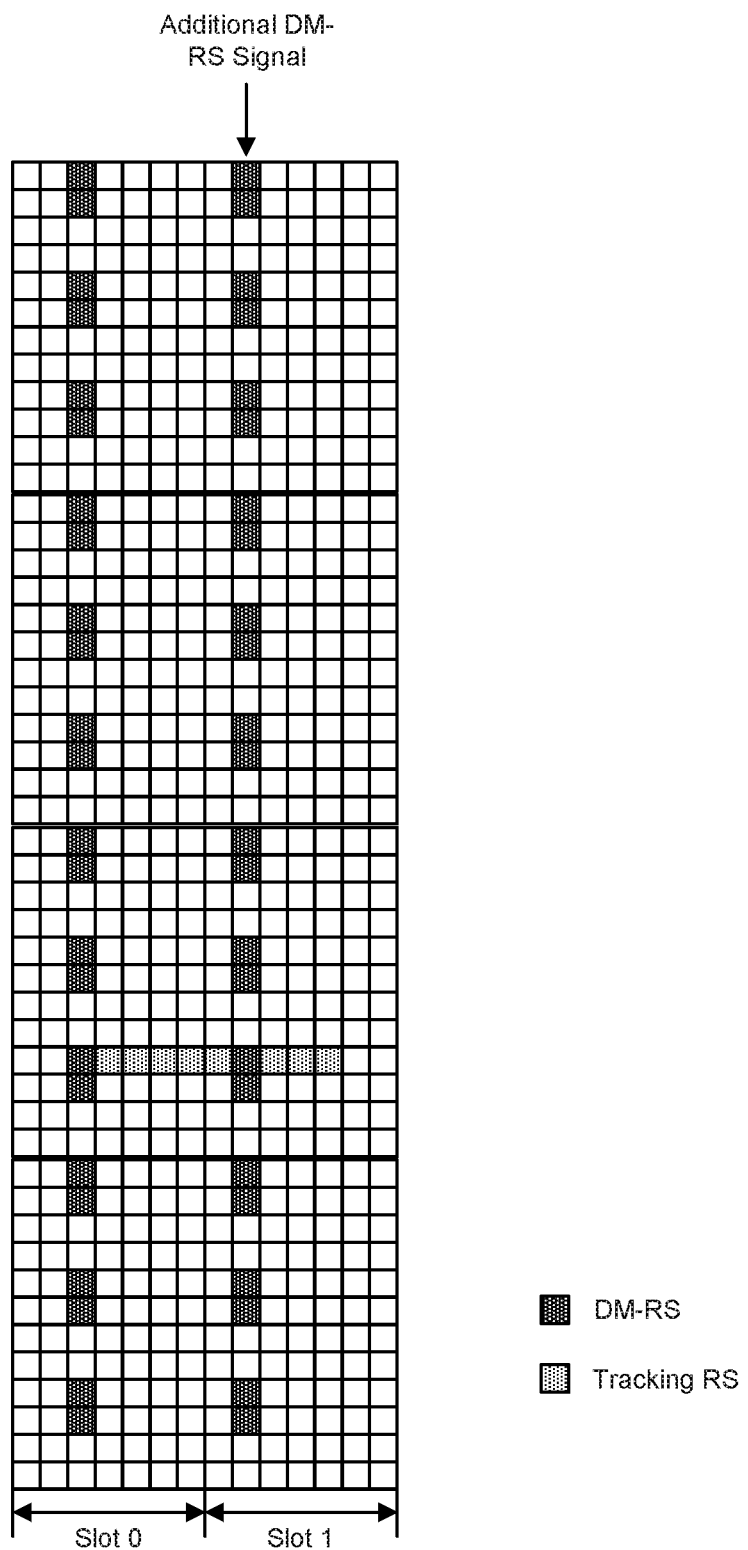
FIG. 6 illustrates a demodulation reference signal (DM-RS) pattern for a high speed scenario in accordance with an example.

FIG. 6 illustrates an exemplary demodulation reference signal (DM-RS) pattern for a high speed scenario. For the high speed scenario, two DM-RS symbols can be allocated for a data channel. This DM-RS pattern for the high speed scenario can improve a link level performance in the presence of relatively large frequency or Doppler spread. In one example, this DM-RS pattern can introduce a relatively large overhead for the high speed scenario. Therefore, an alternative is to consider a higher density PT-RS, e.g., N=2, while maintaining a one DM-RS symbol within a resource allocated for the data channel.

Figure 7:
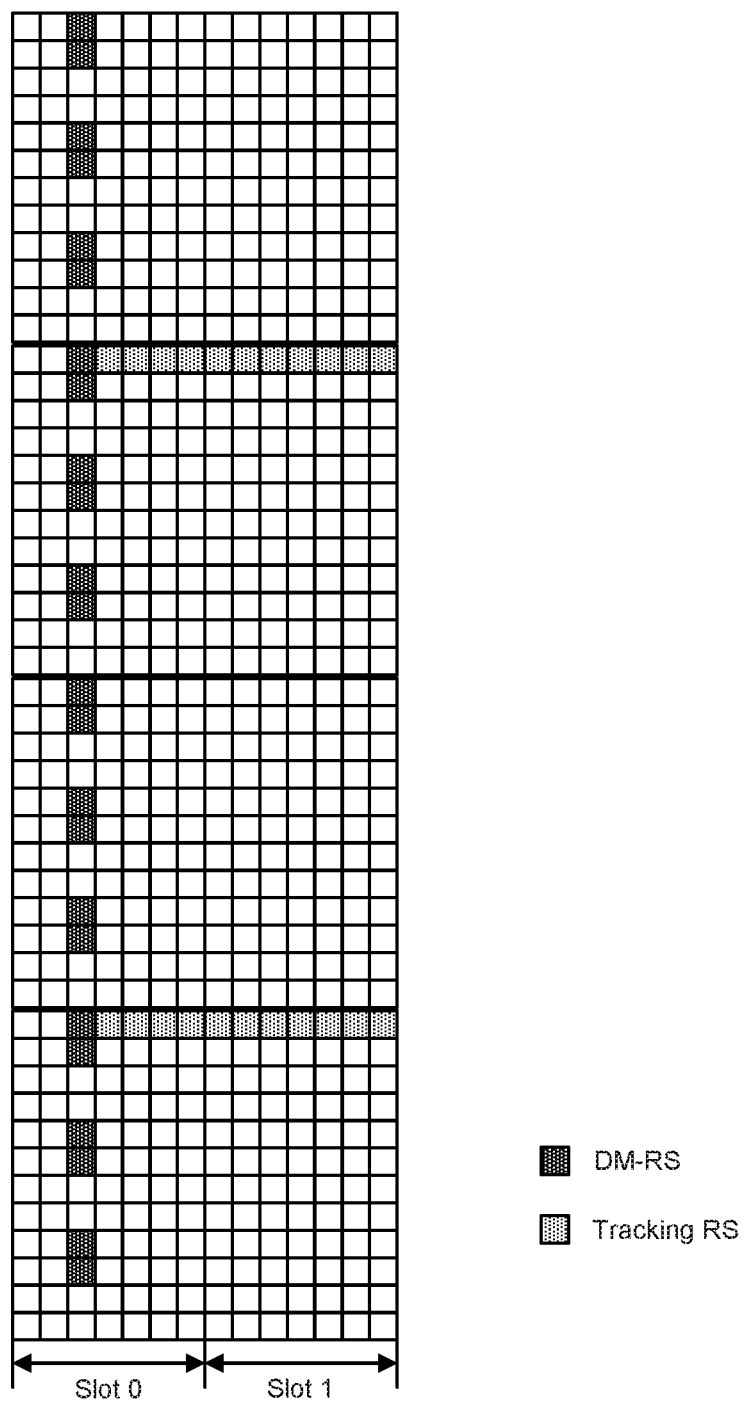
FIG. 7 illustrates another demodulation reference signal (DM-RS) pattern for a high speed scenario in accordance with an example.

FIG. 7 illustrates an exemplary demodulation reference signal (DM-RS) pattern for a high speed scenario. For the high speed scenario, one DM-RS symbol can be allocated for a data channel. The DM-RS pattern can be semi-statically configured by higher layers.

In one configuration, the PT-RS pattern can be determined based on a modulation and coding scheme (MCS) utilized at a UE, which can reflect the SINR. A threshold can be predefined by the wireless communication system or configured by higher layer signaling, which can cause some scheduling restriction on the MU-MIMO case, as co-scheduled UEs are to use a same PT-RS pattern. However, this can reduce an amount of control signaling overhead in the DCI.

Figure 8:
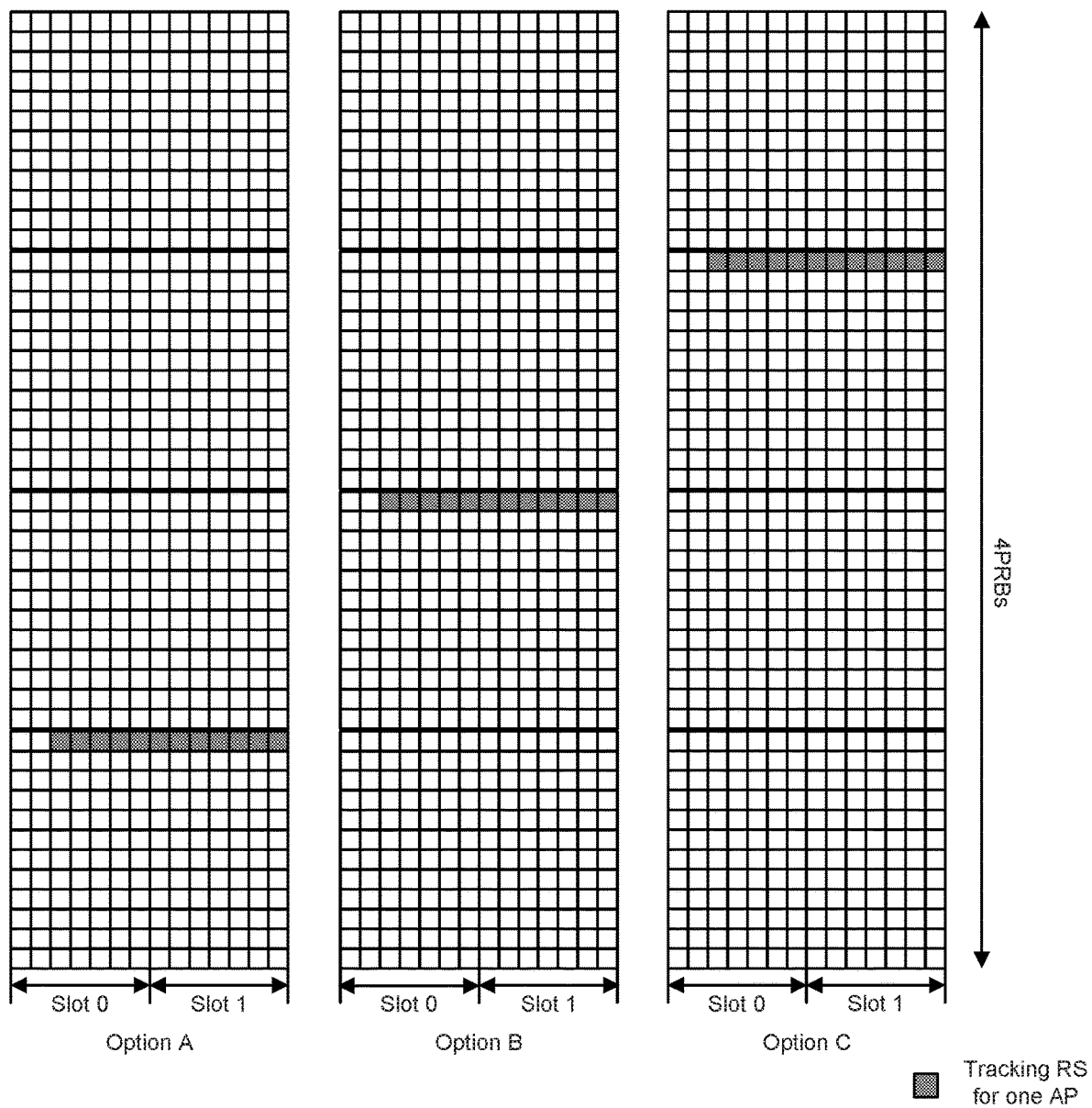
FIG. 8 illustrates a phase tracking reference signal (PT-RS) pattern for different cells in accordance with an example.

FIG. 8 illustrates an exemplary phase tracking reference signal (PT-RS) pattern for different cells. In one example, to randomize inter-cell interference for PT-RS transmission, different cells can transmit the PT-RS in different subcarriers. For example, when $N_{cell}^{ID}$ mod 3=0, the PT-RS can be transmitted in a subcarrier #11, and when $N_{cell}^{ID}$ mod 3=1, the PT-RS can be transmitted in a subcarrier #23, and when $N_{cell}^{ID}$ mod 3=2, the PT-RS can be transmitted in a subcarrier #35, wherein $N_{cell}^{ID}$ is a physical cell ID. Therefore, a PT-RS subcarrier offset can be determined based on the physical cell ID or a virtual cell ID.

Figure 9:
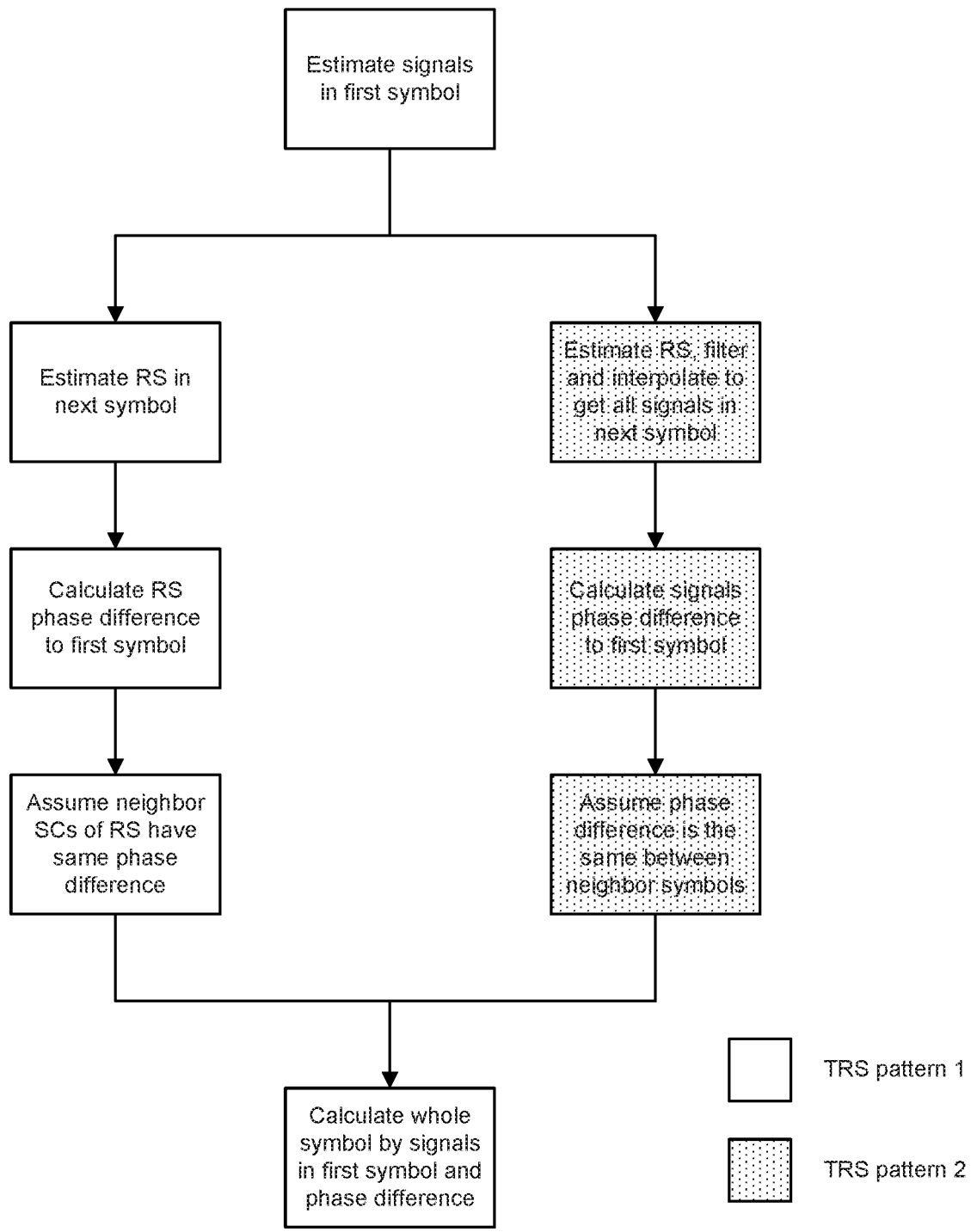
FIG. 9 illustrates a channel estimation process in accordance with an example.

FIG. 9 illustrates an exemplary channel estimation process. The channel estimation can be employed at a symbol-level at a receiver. For example, for a downlink, the channel estimation can be performed at a UE, and for an uplink, the channel estimation can be performed at a base station. The channel estimation can be performed using either a PT-RS pattern 1 or a PT-RS pattern 2 (as described above). With respect to the PT-RS pattern 1, the receiver (e.g., UE or base station) can estimate signals in a first symbol. The receiver can estimate a reference signal (RS) in a next symbol. The receiver can calculate a RS phase difference with respect to the first symbol. The receiver can assume that neighbor SCs of the RS have a same phase difference. The receiver can calculate a whole symbol by signals in the first symbol and the RS phase difference. With respect to the PT-RS pattern 2, the receiver (e.g., UE or base station) can estimate signals in a first symbol. The receiver can estimate a reference signal (RS), filter and interpolate to get all signals in a next symbol. The receiver can calculate a signal phase difference with respect to the first symbol. The receiver can assume that a phase difference is a same between neighbor symbols. The receiver can calculate a whole symbol by signals in the first symbol and the RS phase difference.

Figure 10A:
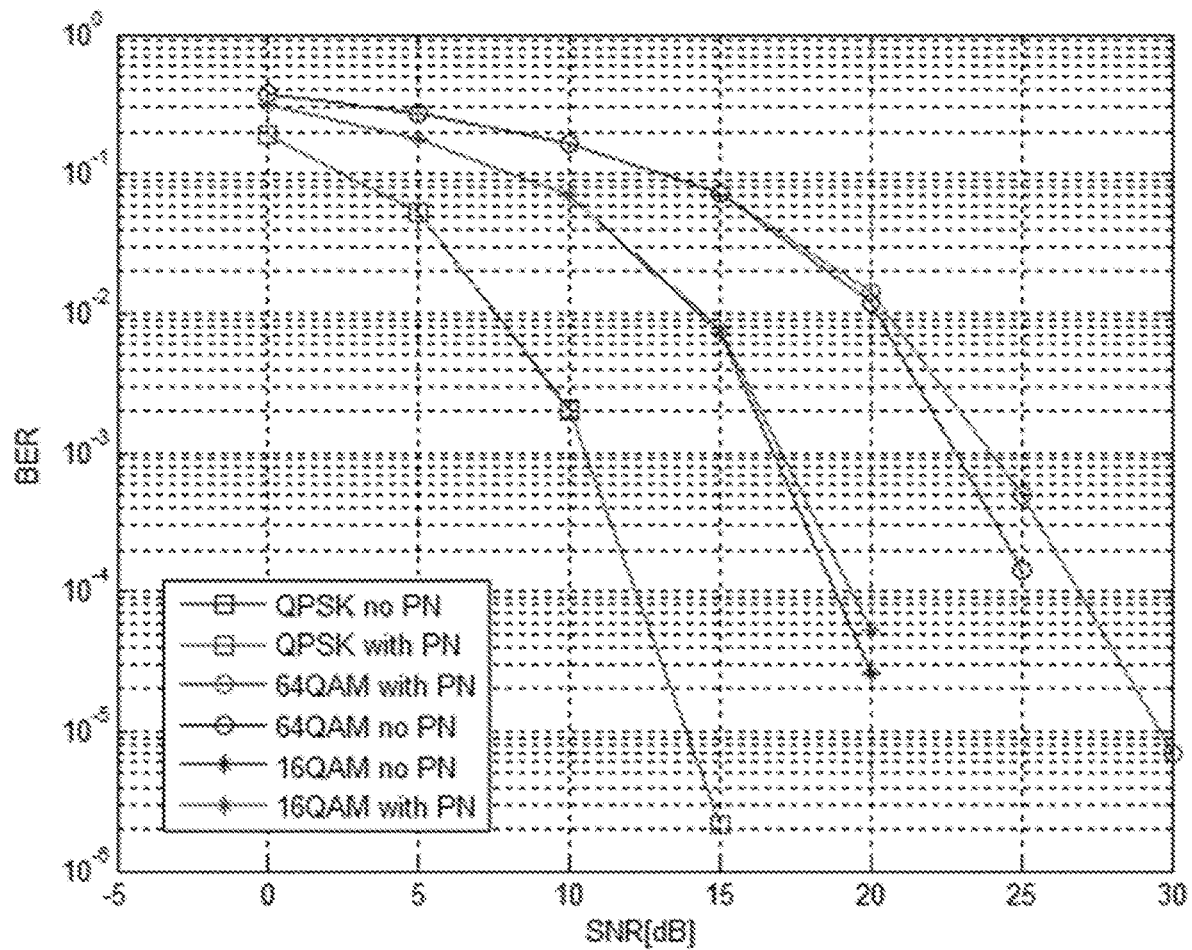
FIG. 10A illustrates a bit error rate (BER) for an additive white Gaussian noise (AWGN) channel using a first phase tracking reference signal (PT-RS) pattern in accordance with an example.
Figure 10B:
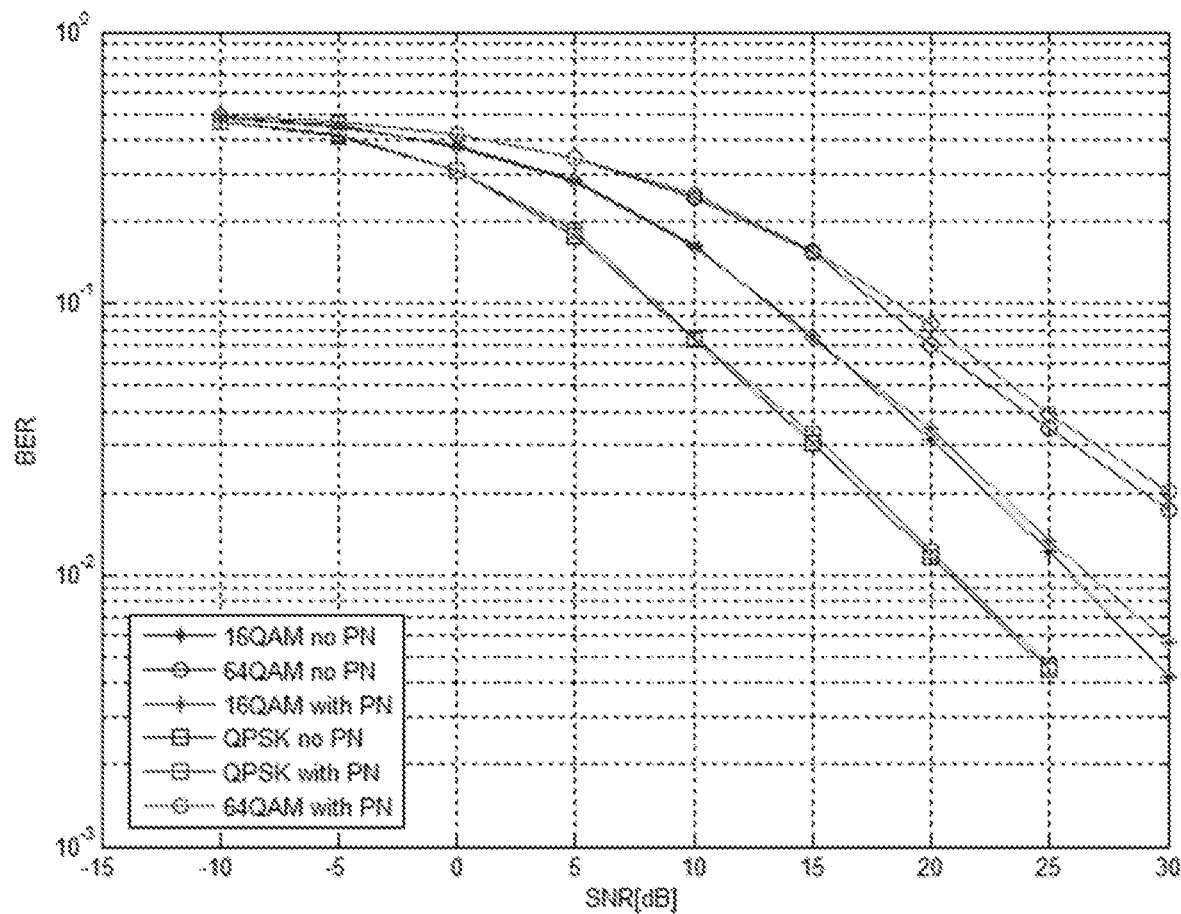
FIG. 10B illustrates a bit error rate (BER) for a Tapped-Delay-Line (TDL) channel with a speed of three kilometers per hour (km/h) using a first phase tracking reference signal (PT-RS) pattern in accordance with an example.
Figure 10C:
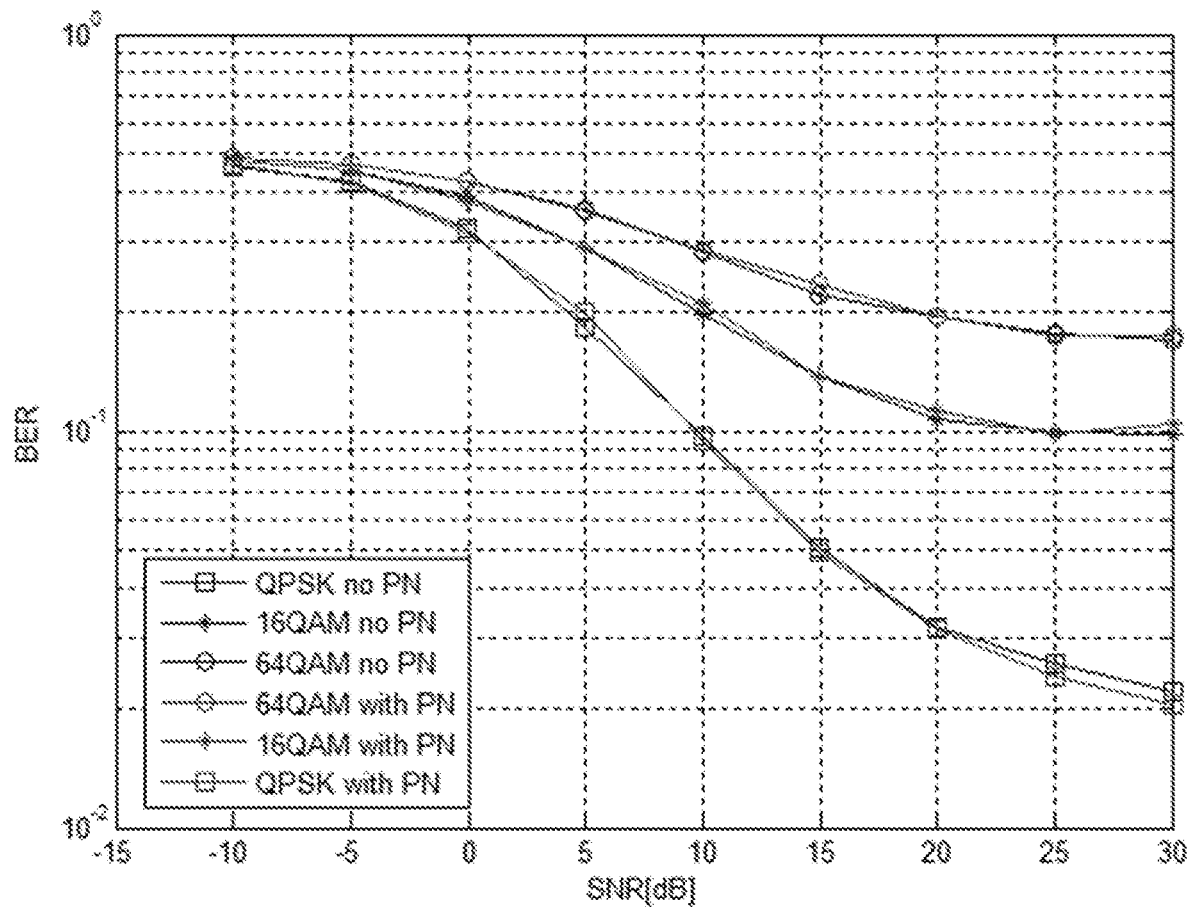
FIG. 10C illustrates a bit error rate (BER) for a Tapped-Delay-Line (TDL) channel with a speed of 50 kilometers per hour (km/h) using a first phase tracking reference signal (PT-RS) pattern in accordance with an example.

FIGS. 10A to 10C illustrate bit error rates (BERs) in different channel models using a PT-RS pattern 1 (as described above) and depending on a phase noise in Fifth Generation (5G) wireless communication systems. For example, FIG. 10A illustrates an exemplary BER for an additive white Gaussian noise (AWGN) channel using the PT-RS pattern 1. FIG. 10B illustrates an exemplary BER for a Tapped-Delay-Line (TDL) channel with a speed of three kilometers per hour (km/h) using the PT-RS pattern 1. FIG. 10C illustrates an exemplary BER for a TDL channel with a speed of 50 km/h using the PT-RS pattern 1. With respect to FIGS. 10A to 10C, the BERs can be shown in relation to a signal to noise ratio (SNR) (measured in decibels, dB). More specifically, with respect to FIGS. 10A to 10C, the BERs can be shown for the following cases: quadrature phase shift keying (QPSK) with no phase noise (PN), QPSK with PN, 64-quadrature amplitude modulation (64 QAM) with no PN, 64 QAM with PN, 16 QAM with no PN, and 16 QAM with PN.

As shown in FIGS. 10A to 10C, a performance gap with PN versus without PN can become larger as a modulation order increases. Meanwhile, as a UE speed increases, the performance gap can begin to decrease. When the UE speed is up to 50 km/h, the performance of both curves (i.e., with PN and without PN) are nearly the same. Therefore, when the UE speed is low, the PN is a dominant factor to affect the decoding performance. However, at high speed scenarios, the Doppler shift can become a dominant factor that affects the decoding performance. In order to improve a channel estimation accuracy, it is advantageous to utilize another PT-RS pattern (e.g., PT-RS pattern 2, as described above) which accounts for both the PN and the Doppler shift to provide for an improved decoding performance.

Figure 11A:
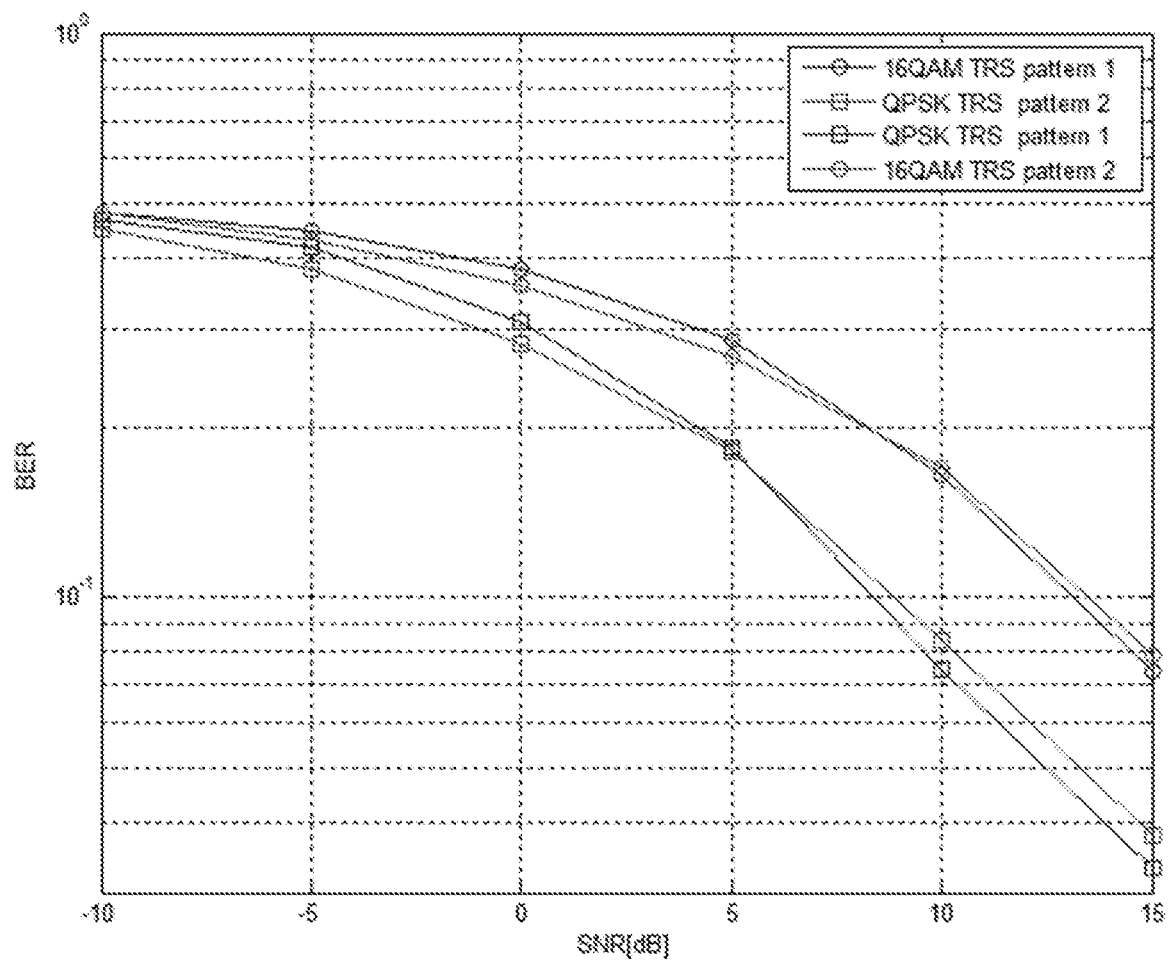
FIG. 11A illustrates a comparison of bit error rates (BERs) for a Tapped-Delay-Line (TDL) channel with a speed of three kilometers per hour (km/h) using a first or second phase tracking reference signal (PT-RS) pattern in accordance with an example.
Figure 11B:
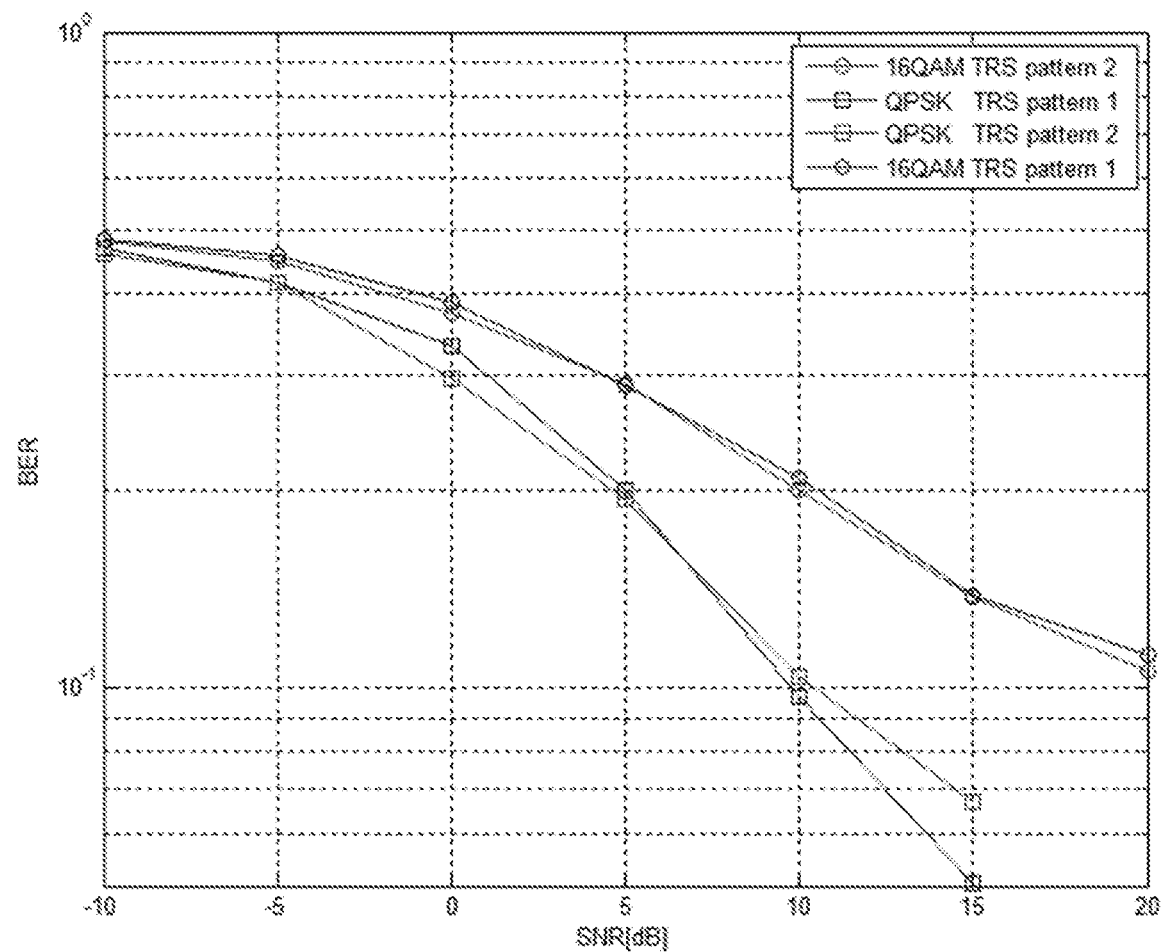
FIG. 11B illustrates a comparison of bit error rates (BERs) for a Tapped-Delay-Line (TDL) channel with a speed of 50 kilometers per hour (km/h) using a first or second phase tracking reference signal (PT-RS) pattern in accordance with an example.

FIGS. 11A and 11B illustrate an exemplary comparison of bit error rates (BERs) between a PT-RS pattern 1 and a PT-RS pattern 2 (as described above). For example, FIG. 11A illustrates an example of a comparison of BERs for a Tapped-Delay-Line (TDL) channel with a speed of three kilometers per hour (km/h) using the PT-RS pattern 1 or the PT-RS pattern 2. FIG. 11B illustrates an example of a comparison of BERs for a TDL channel with a speed of 50 km/h using the PT-RS pattern 1 or the PT-RS pattern 2. With respect to FIGS. 11A and 11B, the BERs can be shown in relation to a signal to noise ratio (SNR) (measured in decibels, dB). More specifically, with respect to FIGS. 11A and 11B, the BERs can be shown for the following cases: 16-quadrature amplitude modulation (16 QAM) PT-RS pattern 1, 16 QAM PT-RS pattern 2, quadrature phase shift keying (QPSK) pattern 1, and QPSK pattern 2.

As shown in FIGS. 11A and 11B, in low SNR scenarios, the performance of the PT-RS pattern 2 can be improved for both high UE speed and low UE speed, as a channel can be estimated more accurately. As shown, the PT-RS pattern 2 can achieve at most 2 dB more gain than the PT-RS pattern 1. However, in high SNR scenarios, the performance gain for the PT-RS pattern 2 can decrease since noise is a dominant factor in low SNR, and a channel estimator has to filter the noise by using additional signals to perform interpolation.

In one configuration, a user equipment (UE) can receive control signaling for a phase tracking reference signal (PT-RS) and determine a resource mapping pattern for the PT-RS based on the control signaling. In one example, multiple PT-RS patterns can be predefined in a specification. In another example, the PT-RS patterns can be configured via higher layer signaling.

In one example, the UE can select a PT-RS pattern from all or a subset of predefined PT-RS patterns to generate the PT-RS. An indicator of the PT-RS pattern can be configured via downlink control information (DCI) or higher layer signaling. In another example, the PT-RS pattern can be determined based on a modulation and coding scheme (MCS) used at the UE. In yet another example, a density of the PT-RS can be configured via the DCI or the higher layer signaling. In a further example, a multiple PT-RS density can be configured and each can be used for one network beam. In yet a further example, a PT-RS subcarrier offset for a PT-RS can be determined based on a cell identity (ID) or a virtual cell ID.

Figure 12:
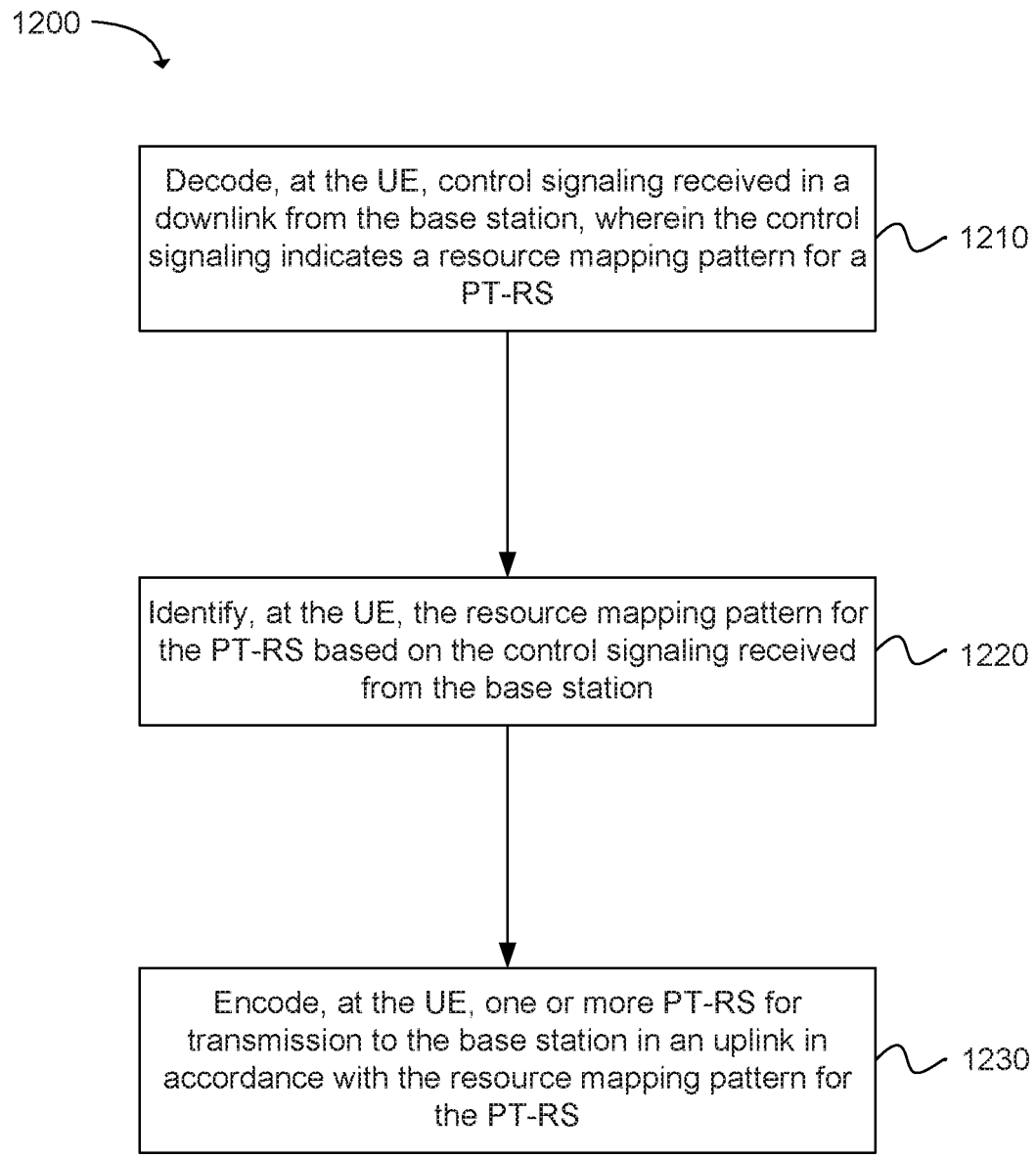
FIG. 12 depicts functionality of a user equipment (UE) operable to decode a resource mapping pattern of a phase tracking reference signal (PT-RS) received from a base station in a wireless network in accordance with an example.

Another example provides functionality 1200 of a UE operable to decode a resource mapping pattern of a phase tracking reference signal (PT-RS) received from a base station in a wireless network, as shown in FIG. 12. The UE can comprise one or more processors configured to decode, at the UE, control signaling received in a downlink from the base station, wherein the control signaling indicates a resource mapping pattern for a PT-RS, as in block 1210. The UE can comprise one or more processors configured to identify, at the UE, the resource mapping pattern for the PT-RS based on the control signaling received from the base station, as in block 1220. The UE can comprise one or more processors configured to encode, at the UE, one or more PT-RS for transmission to the base station in an uplink in accordance with the resource mapping pattern for the PT-RS, as in block 1230. In addition, the UE can comprise a memory interface configured to send to a memory the resource mapping pattern for the PT-RS.

Figure 13:
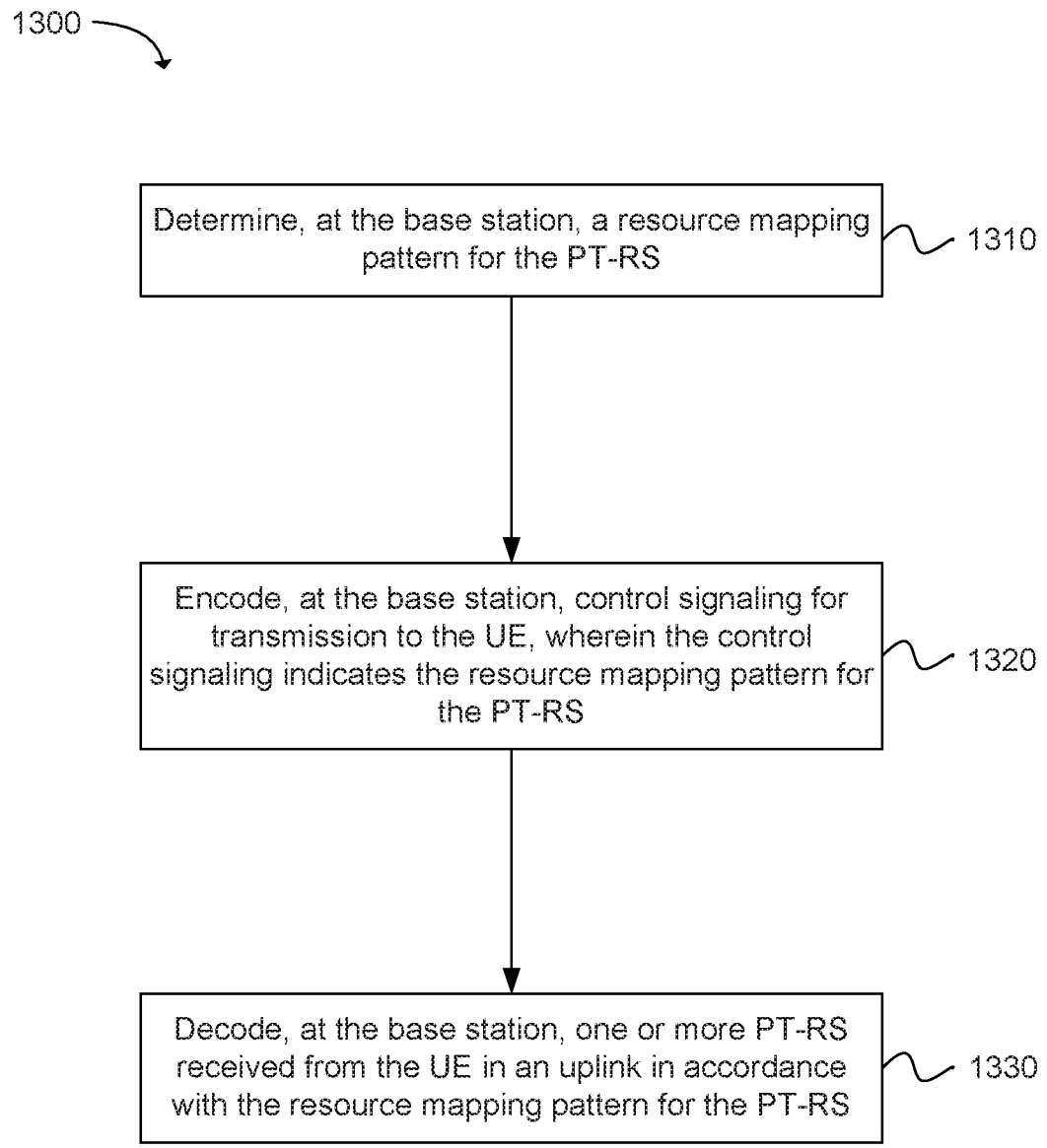
FIG. 13 depicts functionality of a base station operable to encode a resource mapping pattern of a phase tracking reference signal (PT-RS) for transmission to a user equipment (UE) in a wireless network in accordance with an example.

Another example provides functionality 1300 of a base station operable to encode a resource mapping pattern of a phase tracking reference signal (PT-RS) for transmission to a user equipment (UE) in a wireless network, as shown in FIG. 13. The base station can comprise one or more processors configured to determine, at the base station, a resource mapping pattern for the PT-RS, as in block 1310. The base station can comprise one or more processors configured to encode, at the base station, control signaling for transmission to the UE, wherein the control signaling indicates the resource mapping pattern for the PT-RS, as in block 1320. The base station can comprise one or more processors configured to decode, at the base station, one or more PT-RS received from the UE in an uplink in accordance with the resource mapping pattern for the PT-RS, as in block 1330. In addition, the base station can comprise a memory interface configured to send to a memory the resource mapping pattern for the PT-RS.

Figure 14:
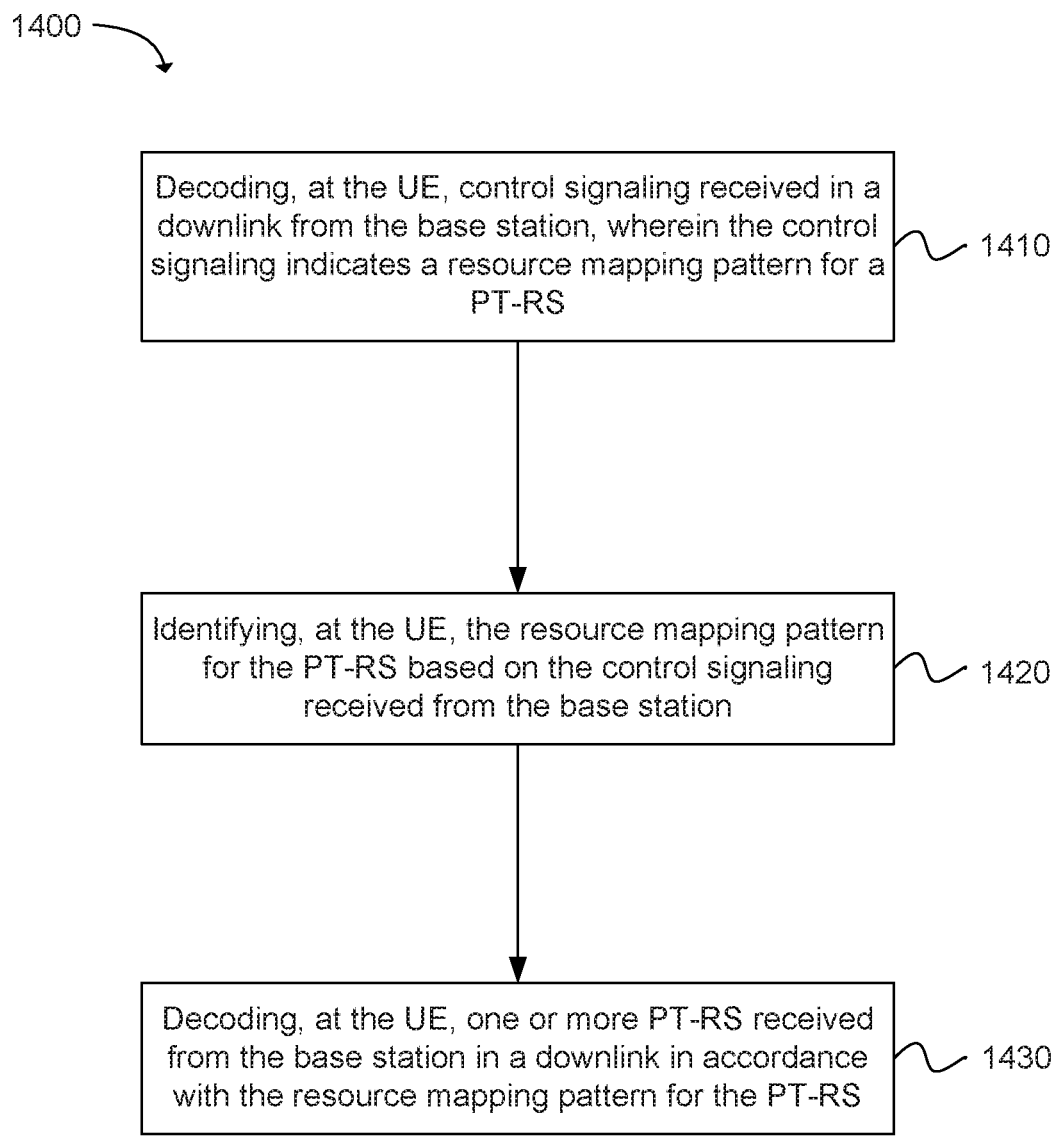
FIG. 14 depicts a flowchart of a machine readable storage medium having instructions embodied thereon for decoding a resource mapping pattern of a phase tracking reference signal (PT-RS) received at a user equipment (UE) from a base station in a wireless network in accordance with an example.

Another example provides at least one machine readable storage medium having instructions 1400 embodied thereon for decoding a resource mapping pattern of a phase tracking reference signal (PT-RS) received at a user equipment (UE) from a base station in a wireless network, as shown in FIG. 14. The instructions can be executed on a machine, where the instructions are included on at least one computer readable medium or one non-transitory machine readable storage medium. The instructions when executed by one or more processors of the UE perform: decoding, at the UE, control signaling received in a downlink from the base station, wherein the control signaling indicates a resource mapping pattern for a PT-RS, as in block 1410. The instructions when executed by one or more processors of the UE perform: identifying, at the UE, the resource mapping pattern for the PT-RS based on the control signaling received from the base station, as in block 1420. The instructions when executed by one or more processors of the UE perform: decoding, at the UE, one or more PT-RS received from the base station in a downlink in accordance with the resource mapping pattern for the PT-RS, as in block 1430.

Figure 15:
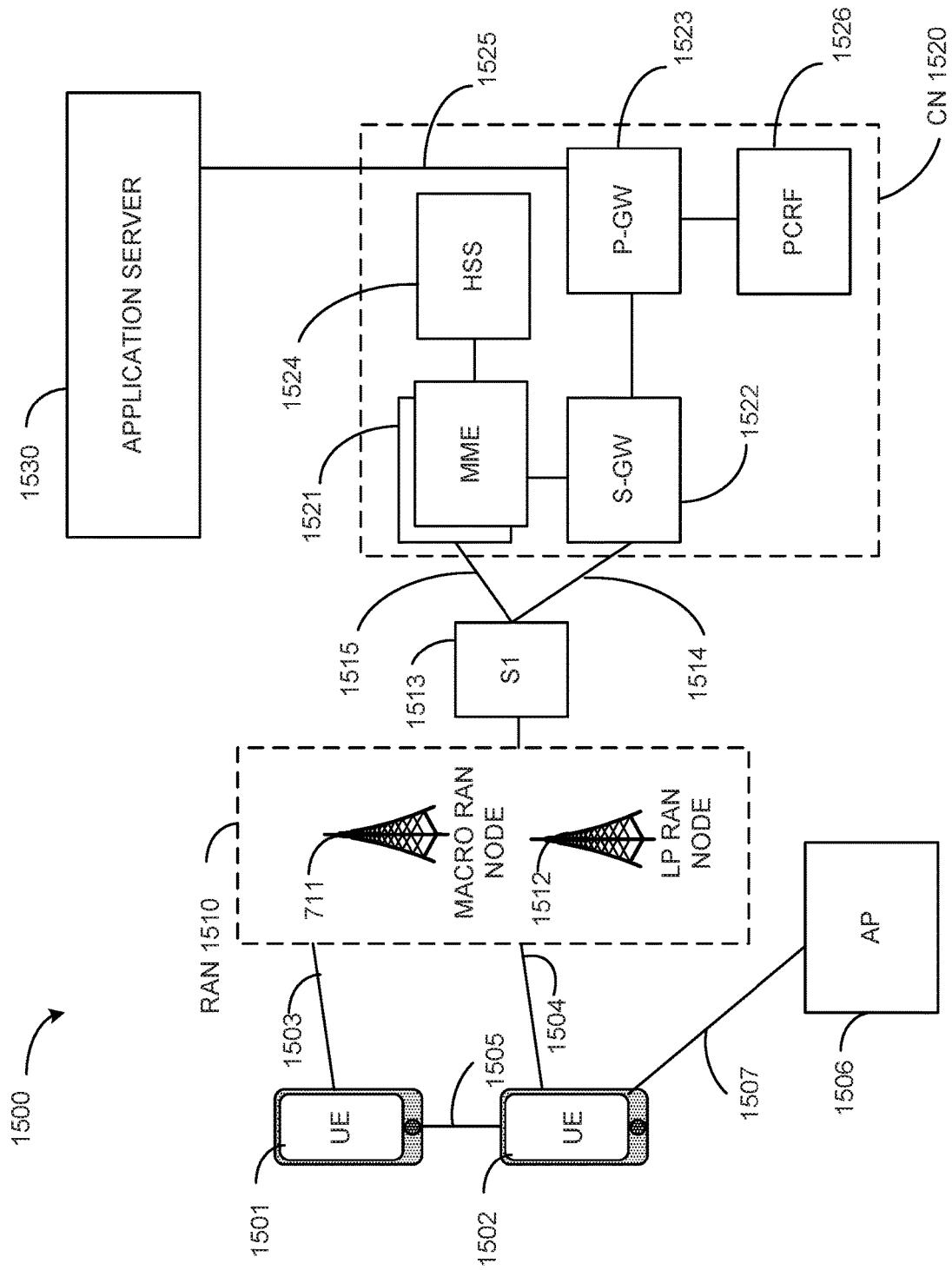
FIG. 15 illustrates an architecture of a wireless network in accordance with an example.

FIG. 15 illustrates an architecture of a system 1500 of a network in accordance with some embodiments. The system 1500 is shown to include a user equipment (UE) 1501 and a UE 1502. The UEs 1501 and 1502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1501 and 1502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1501 and 1502 may be configured to connect, e.g., communicatively couple, with a radio access network (RAN) 1510—the RAN 1510 may be, for example, an Evolved Universal Mobile Telecommunications System (UMTS) Terrestrial Radio Access Network (E-UTRAN), a NextGen RAN (NG RAN), or some other type of RAN. The UEs 1501 and 1502 utilize connections 1503 and 1504, respectively, each of which comprises a physical communications interface or layer (discussed in further detail below); in this example, the connections 1503 and 1504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1501 and 1502 may further directly exchange communication data via a ProSe interface 1505. The ProSe interface 1505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1502 is shown to be configured to access an access point (AP) 1506 via connection 1507. The connection 1507 can comprise a local wireless connection, such as a connection consistent with any IEEE 1602.15 protocol, wherein the AP 1506 would comprise a wireless fidelity (WiFi®) router. In this example, the AP 1506 is shown to be connected to the Internet without connecting to the core network of the wireless system (described in further detail below).

The RAN 1510 can include one or more access nodes that enable the connections 1503 and 1504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1510 may include one or more RAN nodes for providing macrocells, e.g., macro RAN node 1511, and one or more RAN nodes for providing femtocells or picocells (e.g., cells having smaller coverage areas, smaller user capacity, or higher bandwidth compared to macrocells), e.g., low power (LP) RAN node 1512.

Any of the RAN nodes 1511 and 1512 can terminate the air interface protocol and can be the first point of contact for the UEs 1501 and 1502. In some embodiments, any of the RAN nodes 1511 and 1512 can fulfill various logical functions for the RAN 1510 including, but not limited to, radio network controller (RNC) functions such as radio bearer management, uplink and downlink dynamic radio resource management and data packet scheduling, and mobility management.

In accordance with some embodiments, the UEs 1501 and 1502 can be configured to communicate using Orthogonal Frequency-Division Multiplexing (OFDM) communication signals with each other or with any of the RAN nodes 1511 and 1512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1511 and 1512 to the UEs 1501 and 1502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1501 and 1502. The physical downlink control channel (PDCCH) may carry information about the transport format and resource allocations related to the PDSCH channel, among other things. It may also inform the UEs 1501 and 1502 about the transport format, resource allocation, and H-ARQ (Hybrid Automatic Repeat Request) information related to the uplink shared channel. Typically, downlink scheduling (assigning control and shared channel resource blocks to the UE 1502 within a cell) may be performed at any of the RAN nodes 1511 and 1512 based on channel quality information fed back from any of the UEs 1501 and 1502. The downlink resource assignment information may be sent on the PDCCH used for (e.g., assigned to) each of the UEs 1501 and 1502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 16).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1510 is shown to be communicatively coupled to a core network (CN) 1520—via an S1 interface 1513. In embodiments, the CN 1520 may be an evolved packet core (EPC) network, a NextGen Packet Core (NPC) network, or some other type of CN. In this embodiment the S1 interface 1513 is split into two parts: the S1-U interface 1514, which carries traffic data between the RAN nodes 1511 and 1512 and the serving gateway (S-GW) 1522, and the S1-mobility management entity (MME) interface 1515, which is a signaling interface between the RAN nodes 1511 and 1512 and MMEs 1521.

In this embodiment, the CN 1520 comprises the MMEs 1521, the S-GW 1522, the Packet Data Network (PDN) Gateway (P-GW) 1523, and a home subscriber server (HSS) 1524. The MMEs 1521 may be similar in function to the control plane of legacy Serving General Packet Radio Service (GPRS) Support Nodes (SGSN). The MMEs 1521 may manage mobility aspects in access such as gateway selection and tracking area list management. The HSS 1524 may comprise a database for network users, including subscription-related information to support the network entities' handling of communication sessions. The CN 1520 may comprise one or several HSSs 1524, depending on the number of mobile subscribers, on the capacity of the equipment, on the organization of the network, etc. For example, the HSS 1524 can provide support for routing/roaming, authentication, authorization, naming/addressing resolution, location dependencies, etc.

The S-GW 1522 may terminate the S1 interface 1513 towards the RAN 1510, and routes data packets between the RAN 1510 and the CN 1520. In addition, the S-GW 1522 may be a local mobility anchor point for inter-RAN node handovers and also may provide an anchor for inter-3GPP mobility. Other responsibilities may include lawful intercept, charging, and some policy enforcement.

The P-GW 1523 may terminate an SGi interface toward a PDN. The P-GW 1523 may route data packets between the EPC network 1523 and external networks such as a network including the application server 1530 (alternatively referred to as application function (AF)) via an Internet Protocol (IP) interface 1525. Generally, the application server 1530 may be an element offering applications that use IP bearer resources with the core network (e.g., UMTS Packet Services (PS) domain, LTE PS data services, etc.). In this embodiment, the P-GW 1523 is shown to be communicatively coupled to an application server 1530 via an IP communications interface 1525. The application server 1530 can also be configured to support one or more communication services (e.g., Voice-over-Internet Protocol (VoIP) sessions, PTT sessions, group communication sessions, social networking services, etc.) for the UEs 1501 and 1502 via the CN 1520.

The P-GW 1523 may further be a node for policy enforcement and charging data collection. Policy and Charging Enforcement Function (PCRF) 1526 is the policy and charging control element of the CN 1520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1526 may be communicatively coupled to the application server 1530 via the P-GW 1523. The application server 1530 may signal the PCRF 1526 to indicate a new service flow and select the appropriate Quality of Service (QoS) and charging parameters. The PCRF 1526 may provision this rule into a Policy and Charging Enforcement Function (PCEF) (not shown) with the appropriate traffic flow template (TFT) and QoS class of identifier (QCI), which commences the QoS and charging as specified by the application server 1530.

Figure 16:
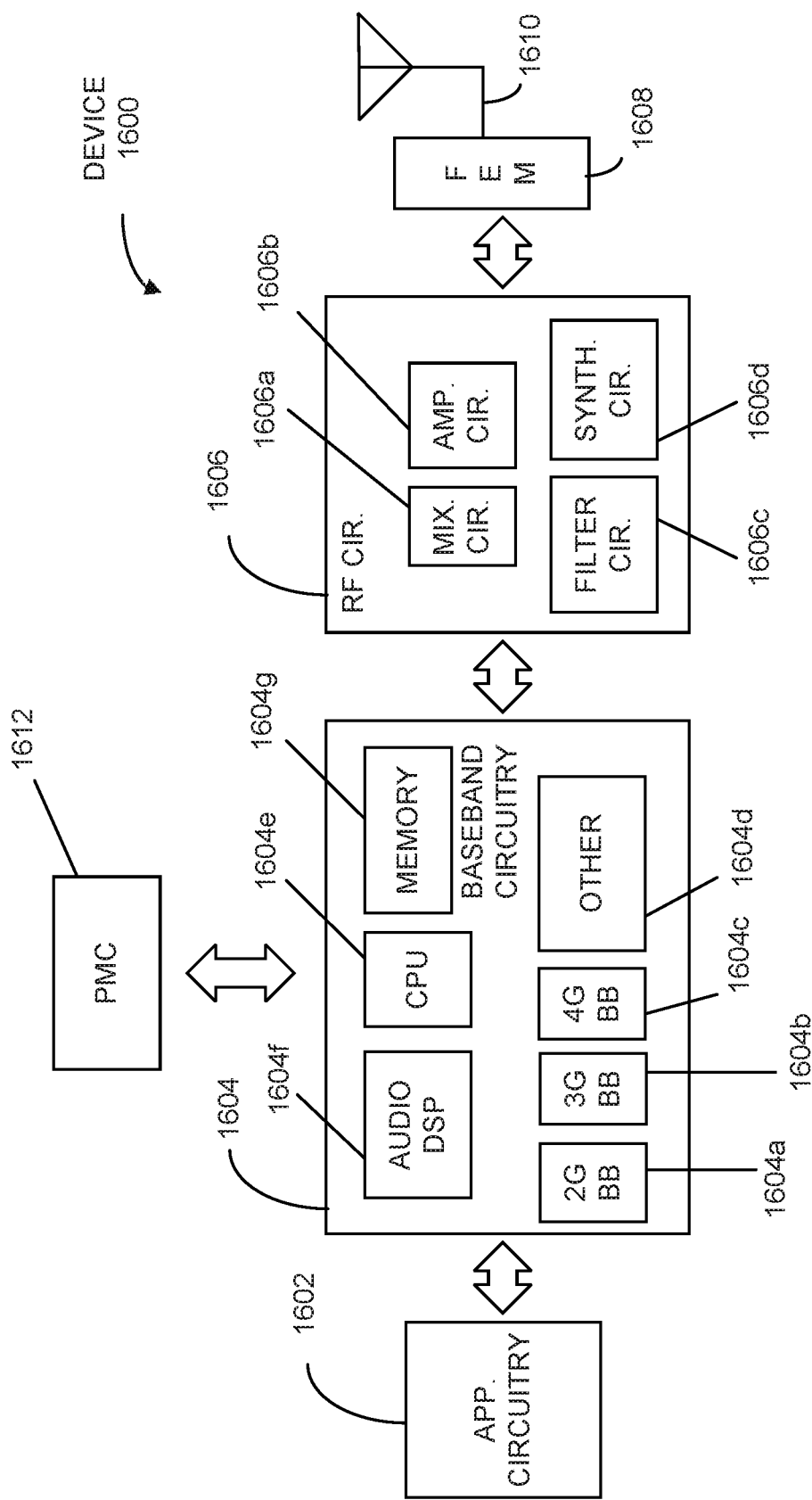
FIG. 16 illustrates a diagram of a wireless device (e.g., UE) in accordance with an example.

FIG. 16 illustrates example components of a device 1600 in accordance with some embodiments. In some embodiments, the device 1600 may include application circuitry 1602, baseband circuitry 1604, Radio Frequency (RF) circuitry 1606, front-end module (FEM) circuitry 1608, one or more antennas 1610, and power management circuitry (PMC) 1612 coupled together at least as shown. The components of the illustrated device 1600 may be included in a UE or a RAN node. In some embodiments, the device 1600 may include less elements (e.g., a RAN node may not utilize application circuitry 1602, and instead include a processor/controller to process IP data received from an EPC). In some embodiments, the device 1600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1602 may include one or more application processors. For example, the application circuitry 1602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1600. In some embodiments, processors of application circuitry 1602 may process IP data packets received from an EPC.

The baseband circuitry 1604 may include circuitry such as, but not limited to, one or more single-core or multi-core processors. The baseband circuitry 1604 may include one or more baseband processors or control logic to process baseband signals received from a receive signal path of the RF circuitry 1606 and to generate baseband signals for a transmit signal path of the RF circuitry 1606. Baseband processing circuity 1604 may interface with the application circuitry 1602 for generation and processing of the baseband signals and for controlling operations of the RF circuitry 1606. For example, in some embodiments, the baseband circuitry 1604 may include a third generation (3G) baseband processor 1604*a*, a fourth generation (4G) baseband processor 1604*b*, a fifth generation (5G) baseband processor 1604*c*, or other baseband processor(s) 1604*d* for other existing generations, generations in development or to be developed in the future (e.g., second generation (2G), sixth generation (6G), etc.). The baseband circuitry 1604 (e.g., one or more of baseband processors 1604*a-d*) may handle various radio control functions that enable communication with one or more radio networks via the RF circuitry 1606. In other embodiments, some or all of the functionality of baseband processors 1604*a-d* may be included in modules stored in the memory 1604*g* and executed via a Central Processing Unit (CPU) 1604*e*. The radio control functions may include, but are not limited to, signal modulation/demodulation, encoding/decoding, radio frequency shifting, etc. In some embodiments, modulation/demodulation circuitry of the baseband circuitry 1604 may include Fast-Fourier Transform (FFT), precoding, or constellation mapping/demapping functionality. In some embodiments, encoding/decoding circuitry of the baseband circuitry 1604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1604 may include one or more audio digital signal processor(s) (DSP) 1604*f*. The audio DSP(s) 1604*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1604 and the application circuitry 1602 may be implemented together such as, for example, on a system on a chip (SOC).

In some embodiments, the baseband circuitry 1604 may provide for communication compatible with one or more radio technologies. For example, in some embodiments, the baseband circuitry 1604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1604 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path which may include circuitry to down-convert RF signals received from the FEM circuitry 1608 and provide baseband signals to the baseband circuitry 1604. RF circuitry 1606 may also include a transmit signal path which may include circuitry to up-convert baseband signals provided by the baseband circuitry 1604 and provide RF output signals to the FEM circuitry 1608 for transmission.

In some embodiments, the receive signal path of the RF circuitry 1606 may include mixer circuitry 1606a, amplifier circuitry 1606b and filter circuitry 1606c. In some embodiments, the transmit signal path of the RF circuitry 1606 may include filter circuitry 1606c and mixer circuitry 1606a. RF circuitry 1606 may also include synthesizer circuitry 1606d for synthesizing a frequency for use by the mixer circuitry 1606a of the receive signal path and the transmit signal path. In some embodiments, the mixer circuitry 1606a of the receive signal path may be configured to down-convert RF signals received from the FEM circuitry 1608 based on the synthesized frequency provided by synthesizer circuitry 1606d. The amplifier circuitry 1606b may be configured to amplify the down-converted signals and the filter circuitry 1606c may be a low-pass filter (LPF) or band-pass filter (BPF) configured to remove unwanted signals from the down-converted signals to generate output baseband signals. Output baseband signals may be provided to the baseband circuitry 1604 for further processing. In some embodiments, the output baseband signals may be zero-frequency baseband signals, although this is not a requirement. In some embodiments, mixer circuitry 1606a of the receive signal path may comprise passive mixers, although the scope of the embodiments is not limited in this respect.

In some embodiments, the mixer circuitry 1606a of the transmit signal path may be configured to up-convert input baseband signals based on the synthesized frequency provided by the synthesizer circuitry 1606d to generate RF output signals for the FEM circuitry 1608. The baseband signals may be provided by the baseband circuitry 1604 and may be filtered by filter circuitry 1606c.

In some embodiments, the mixer circuitry 1606a of the receive signal path and the mixer circuitry 1606a of the transmit signal path may include two or more mixers and may be arranged for quadrature downconversion and upconversion, respectively. In some embodiments, the mixer circuitry 1606a of the receive signal path and the mixer circuitry 1606a of the transmit signal path may include two or more mixers and may be arranged for image rejection (e.g., Hartley image rejection). In some embodiments, the mixer circuitry 1606a of the receive signal path and the mixer circuitry 1606a may be arranged for direct downconversion and direct upconversion, respectively. In some embodiments, the mixer circuitry 1606a of the receive signal path and the mixer circuitry 1606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1604 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606d may be a fractional-N synthesizer or a fractional N/N+1 synthesizer, although the scope of the embodiments is not limited in this respect as other types of frequency synthesizers may be suitable. For example, synthesizer circuitry 1606d may be a delta-sigma synthesizer, a frequency multiplier, or a synthesizer comprising a phase-locked loop with a frequency divider.

The synthesizer circuitry 1606d may be configured to synthesize an output frequency for use by the mixer circuitry 1606a of the RF circuitry 1606 based on a frequency input and a divider control input. In some embodiments, the synthesizer circuitry 1606d may be a fractional N/N+1 synthesizer.

In some embodiments, frequency input may be provided by a voltage controlled oscillator (VCO), although that is not a requirement. Divider control input may be provided by either the baseband circuitry 1604 or the applications processor 1602 depending on the desired output frequency. In some embodiments, a divider control input (e.g., N) may be determined from a look-up table based on a channel indicated by the applications processor 1602.

Synthesizer circuitry 1606d of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path which may include circuitry configured to operate on RF signals received from one or more antennas 1610, amplify the received signals and provide the amplified versions of the received signals to the RF circuitry 1606 for further processing. FEM circuitry 1608 may also include a transmit signal path which may include circuitry configured to amplify signals for transmission provided by the RF circuitry 1606 for transmission by one or more of the one or more antennas 1610. In various embodiments, the amplification through the transmit or receive signal paths may be done solely in the RF circuitry 1606, solely in the FEM 1608, or in both the RF circuitry 1606 and the FEM 1608.

In some embodiments, the FEM circuitry 1608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission (e.g., by one or more of the one or more antennas 1610).

In some embodiments, the PMC 1612 may manage power provided to the baseband circuitry 1604. In particular, the PMC 1612 may control power-source selection, voltage scaling, battery charging, or DC-to-DC conversion. The PMC 1612 may often be included when the device 1600 is capable of being powered by a battery, for example, when the device is included in a UE. The PMC 1612 may increase the power conversion efficiency while providing desirable implementation size and heat dissipation characteristics.

While FIG. 16 shows the PMC 1612 coupled only with the baseband circuitry 1604. However, in other embodiments, the PMC 1612 may be additionally or alternatively coupled with, and perform similar power management operations for, other components such as, but not limited to, application circuitry 1602, RF circuitry 1606, or FEM 1608.

In some embodiments, the PMC 1612 may control, or otherwise be part of, various power saving mechanisms of the device 1600. For example, if the device 1600 is in an RRC Connected state, where it is still connected to the RAN node as it expects to receive traffic shortly, then it may enter a state known as Discontinuous Reception Mode (DRX) after a period of inactivity. During this state, the device 1600 may power down for brief intervals of time and thus save power.

If there is no data traffic activity for an extended period of time, then the device 1600 may transition off to an RRC Idle state, where it disconnects from the network and does not perform operations such as channel quality feedback, handover, etc. The device 1600 goes into a very low power state and it performs paging where again it periodically wakes up to listen to the network and then powers down again. The device 1600 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1602 and processors of the baseband circuitry 1604 may be used to execute elements of one or more instances of a protocol stack. For example, processors of the baseband circuitry 1604, alone or in combination, may be used execute Layer 3, Layer 2, or Layer 1 functionality, while processors of the application circuitry 1604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 17:
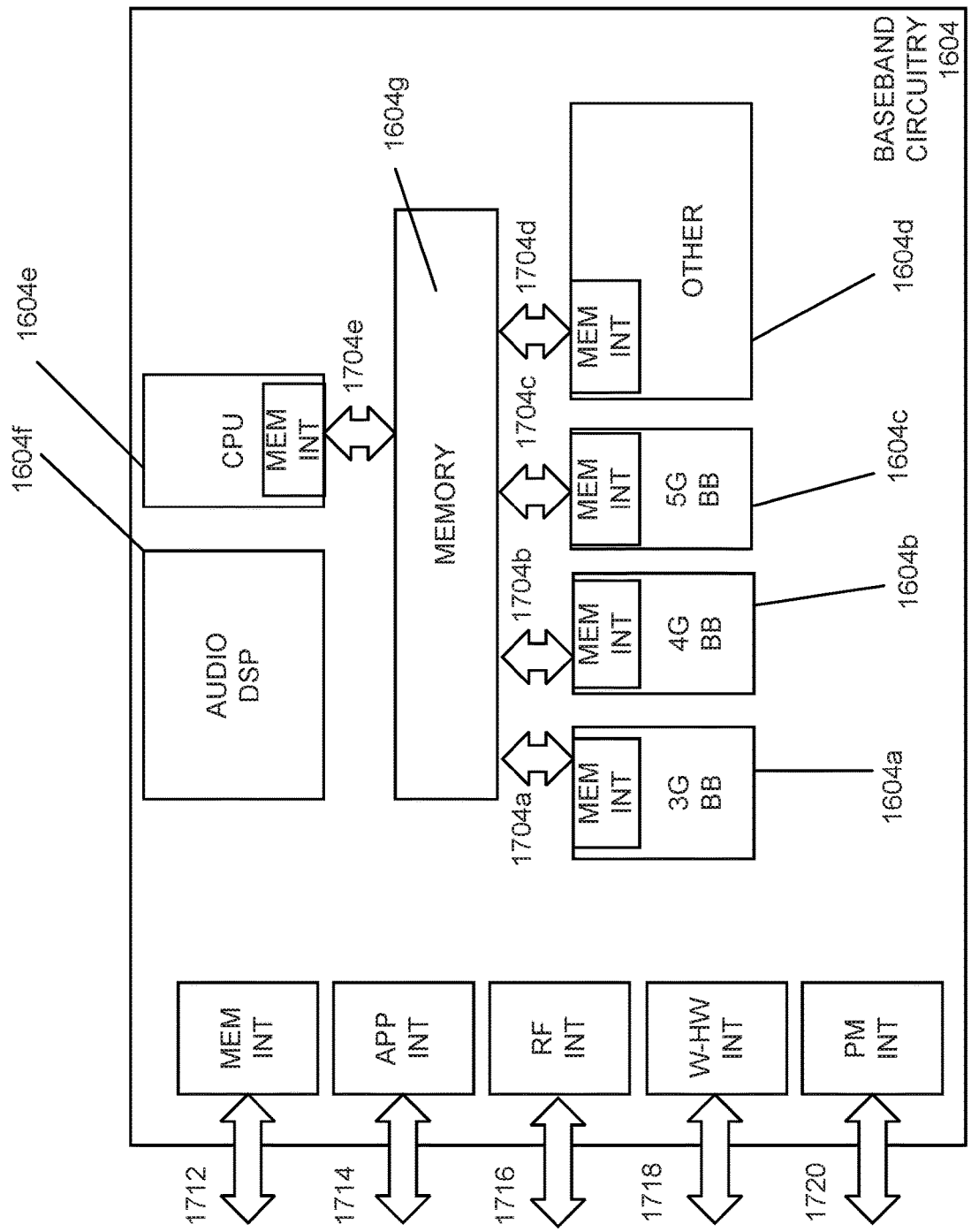
FIG. 17 illustrates interfaces of baseband circuitry in accordance with an example.

FIG. 17 illustrates example interfaces of baseband circuitry in accordance with some embodiments. As discussed above, the baseband circuitry 1604 of FIG. 16 may comprise processors 1604a-1604e and a memory 1604g utilized by said processors. Each of the processors 1604a-1604e may include a memory interface, 1704a-1704e, respectively, to send/receive data to/from the memory 1604g.

The baseband circuitry 1604 may further include one or more interfaces to communicatively couple to other circuitries/devices, such as a memory interface 1712 (e.g., an interface to send/receive data to/from memory external to the baseband circuitry 1604), an application circuitry interface 1714 (e.g., an interface to send/receive data to/from the application circuitry 1602 of FIG. 16), an RF circuitry interface 1716 (e.g., an interface to send/receive data to/from RF circuitry 1606 of FIG. 16), a wireless hardware connectivity interface 1718 (e.g., an interface to send/receive data to/from Near Field Communication (NFC) components, Bluetooth® components (e.g., Bluetooth® Low Energy), Wi-Fi® components, and other communication components), and a power management interface 1720 (e.g., an interface to send/receive power or control signals to/from the PMC 1612.

Figure 18:
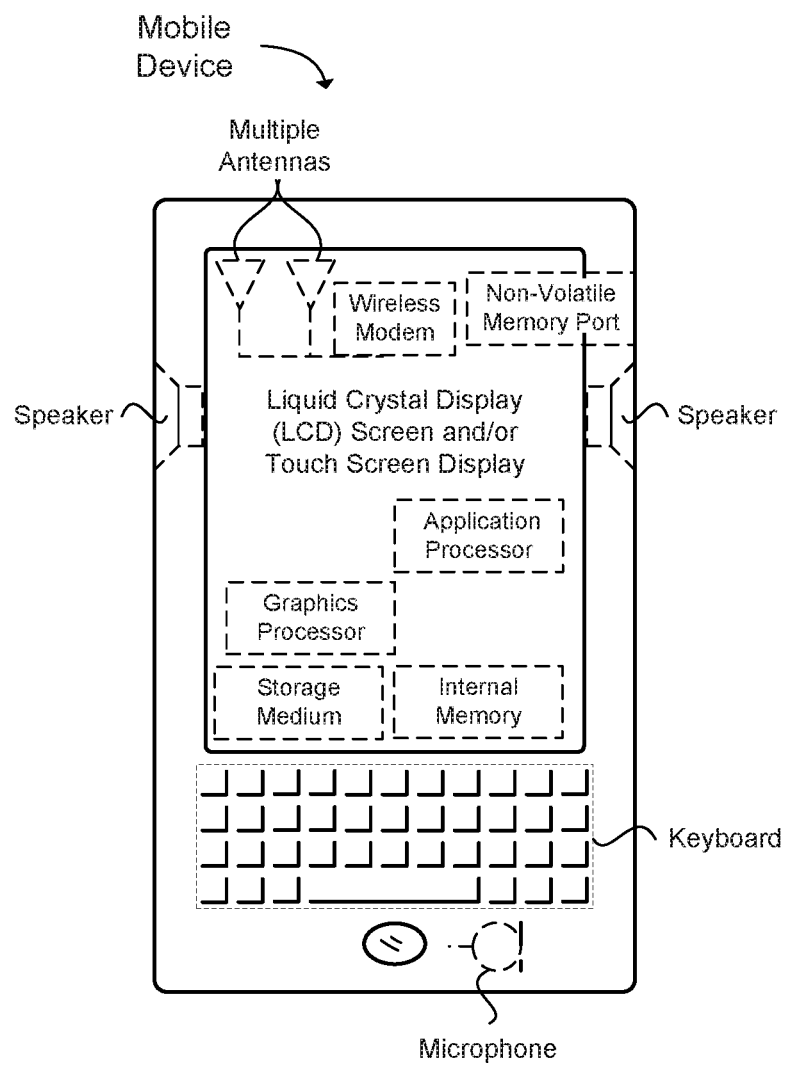
FIG. 18 illustrates a diagram of a wireless device (e.g., UE) in accordance with an example.

FIG. 18 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 18 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to decode a resource mapping pattern of a phase tracking reference signal (PT-RS) received from a base station in a wireless network, the apparatus comprising: one or more processors configured to: decode, at the UE, control signaling received in a downlink from the base station, wherein the control signaling indicates a resource mapping pattern for a PT-RS; identify, at the UE, the resource mapping pattern for the PT-RS based on the control signaling received from the base station; and encode, at the UE, one or more PT-RS for transmission to the base station in an uplink in accordance with the resource mapping pattern for the PT-RS; and a memory interface configured to send to a memory the resource mapping pattern for the PT-RS.

Example 2 includes the apparatus of Example 1, further comprising a transceiver configured to: receive, from the base station, the control signaling that indicates the resource mapping pattern for the PT-RS; and transmit the one or more PT-RS to the base station in accordance with the resource mapping pattern for the PT-RS.

Example 3 includes the apparatus of any of Examples 1 to 2, wherein the one or more processors are further configured to select a resource mapping pattern for the PT-RS from a set of resource mapping patterns for the PT-RS that are predefined at the UE, wherein the resource mapping pattern for the PT-RS is selected based on the control signaling received from the base station.

Example 4 includes the apparatus of any of Examples 1 to 3, wherein the one or more processors are configured to decode the resource mapping pattern for the PT-RS received from the base station via a higher layer signaling or a radio resource control (RRC) signaling.

Example 5 includes the apparatus of any of Examples 1 to 4, wherein the one or more processors are configured to decode the resource mapping pattern for the PT-RS received from the base station via downlink control information (DCI), wherein the DCI includes one or more values to indicate different resource mapping patterns for the PT-RS.

Example 6 includes the apparatus of any of Examples 1 to 5, wherein the resource mapping pattern for the PT-RS is based on one or more of: a modulation and coding scheme (MCS) utilized at the UE, an allocated bandwidth, a subcarrier spacing or a phase noise characteristic.

Example 7 includes the apparatus of any of Examples 1 to 6, wherein a subcarrier offset of the resource mapping pattern of the PT-RS is based on a cell identity (ID) or a virtual cell ID.

Example 8 includes the apparatus of any of Examples 1 to 7, wherein different resource mapping patterns for the PT-RS create different time and frequency densities of the PT-RS.

Example 9 includes the apparatus of any of Examples 1 to 8, wherein the resource mapping pattern for the PT-RS indicates that there is no PT-RS transmission from the UE.

Example 10 includes the apparatus of any of Examples 1 to 9, wherein the PT-RS for one antenna port spans one subcarrier every N physical resource blocks (PRBs), wherein N is an integer that is semi-statically or dynamically adjusted according to a UE capability or a use case, wherein the use case is dependent on one or more of: a modulation and coding schemes (MCS), an allocated bandwidth or a subcarrier spacing.

Example 11 includes the apparatus of any of Examples 1 to 10, wherein the resource mapping pattern for the PT-RS is an adaptive pattern that is configured by the base station based on a presence of a phase noise limited scenario in the wireless network or a noise and carrier frequency offset (CFO) limited scenario in the wireless network, wherein the phase noise limited scenario indicates that phase noise is a dominant factor affecting the wireless network and the CFO limited scenario indicates that CFO is a dominant factor affecting the wireless network.

Example 12 includes an apparatus of a base station operable to encode a resource mapping pattern of a phase tracking reference signal (PT-RS) for transmission to a user equipment (UE) in a wireless network, the apparatus comprising: one or more processors configured to: determine, at the base station, a resource mapping pattern for the PT-RS; encode, at the base station, control signaling for transmission to the UE, wherein the control signaling indicates the resource mapping pattern for the PT-RS; and decode, at the base station, one or more PT-RS received from the UE in an uplink in accordance with the resource mapping pattern for the PT-RS; and a memory interface configured to send to a memory the resource mapping pattern for the PT-RS.

Example 13 includes the apparatus of Example 12, wherein the one or more processors are further configured to: compensate for a phase rotation based on the one or more PT-RS received from the UE in the uplink in accordance with the resource mapping pattern for the PT-RS; and estimate a channel quality of a channel between the base station and the UE after the phase rotation is compensated based on the one or more PT-RS received from the UE.

Example 14 includes the apparatus of any of Examples 12 to 13, wherein the one or more processors are configured to encode the resource mapping pattern for the PT-RS RS for transmission to the UE via higher layer signaling or a radio resource control (RRC) signaling.

Example 15 includes the apparatus of any of Examples 12 to 14, wherein the one or more processors are configured to encode the resource mapping pattern for the PT-RS for transmission to the UE via an enhanced master information block (xMIB) or an enhanced system information block (xSIB).

Example 16 includes the apparatus of any of Examples 12 to 15, wherein the one or more processors are configured to encode the resource mapping pattern for the PT-RS for transmission to the UE via downlink control information (DCI), wherein the DCI includes one or more values to indicate different resource mapping patterns for the PT-RS.

Example 17 includes the apparatus of any of Examples 12 to 16, wherein the one or more processors are further configured to determine the resource mapping pattern for the PT-RS based on a modulation and coding scheme (MCS) utilized by the base station.

Example 18 includes the apparatus of any of Examples 12 to 17, wherein the one or more processors are further configured to determine the resource mapping pattern for the PT-RS with a subcarrier offset that is based on a cell identity (ID) or a virtual cell ID.

Example 19 includes the apparatus of any of Examples 12 to 18, wherein the one or more processors are further configured to determine the resource mapping pattern for the PT-RS based on a presence of a phase noise limited scenario in the wireless network or a noise and carrier frequency offset (CFO) limited scenario in the wireless network.

Example 20 includes at least one machine readable storage medium having instructions embodied thereon for decoding a resource mapping pattern of a phase tracking reference signal (PT-RS) received at a user equipment (UE) from a base station in a wireless network, the instructions when executed by one or more processors of the UE perform the following: decoding, at the UE, control signaling received in a downlink from the base station, wherein the control signaling indicates a resource mapping pattern for a PT-RS; identifying, at the UE, the resource mapping pattern for the PT-RS based on the control signaling received from the base station; and decoding, at the UE, one or more PT-RS received from the base station in a downlink in accordance with the resource mapping pattern for the PT-RS.

Example 21 includes the at least one machine readable storage medium of Example 20, further comprising instructions when executed perform the following: compensating for a phase rotation based on the one or more PT-RS received from the base station in the downlink in accordance with the resource mapping pattern for the PT-RS; and estimating a channel quality of a channel between the UE and the base station after the phase rotation is compensated based on the one or more PT-RS received from the base station.

Example 22 includes the at least one machine readable storage medium of any of Examples 20 to 21, further comprising instructions when executed perform the following: decoding the resource mapping pattern for the PT-RS received from the base station via a higher layer signaling or a radio resource control (RRC) signaling; or decoding the resource mapping pattern for the PT-RS received from the base station via downlink control information (DCI), wherein the DCI includes one or more values to indicate different resource mapping patterns for the PT-RS.

Example 23 includes the at least one machine readable storage medium of any of Examples 20 to 22, wherein: the resource mapping pattern for the PT-RS is based on one or more of: a modulation and coding scheme (MCS) utilized at the UE, an allocated bandwidth, a subcarrier spacing or a phase noise characteristic; or different resource mapping patterns for the PT-RS create different time and frequency densities of the PT-RS.

Example 24 includes the at least one machine readable storage medium of any of Examples 20 to 23, wherein the PT-RS for one antenna port spans one subcarrier every N physical resource blocks (PRBs), wherein N is an integer that is semi-statically or dynamically adjusted according to a UE capability or a use case, wherein the use case is dependent on one or more of: a modulation and coding schemes (MCS), an allocated bandwidth or a subcarrier spacing.

Example 25 includes the at least one machine readable storage medium of any of Examples 20 to 24, wherein the resource mapping pattern for the PT-RS is an adaptive pattern that is configured by the base station based on a presence of a phase noise limited scenario in the wireless network or a noise and carrier frequency offset (CFO) limited scenario in the wireless network, wherein the phase noise limited scenario indicates that phase noise is a dominant factor affecting the wireless network and the CFO limited scenario indicates that CFO is a dominant factor affecting the wireless network.

Example 26 includes a user equipment (UE) operable to decode a resource mapping pattern of a phase tracking reference signal (PT-RS) received at from a base station in a wireless network, the UE comprising: means for decoding, at the UE, control signaling received in a downlink from the base station, wherein the control signaling indicates a resource mapping pattern for a PT-RS; means for identifying, at the UE, the resource mapping pattern for the PT-RS based on the control signaling received from the base station; and means for decoding, at the UE, one or more PT-RS received from the base station in a downlink in accordance with the resource mapping pattern for the PT-RS.

Example 27 includes the UE of Example 26, further comprising: means for compensating for a phase rotation based on the one or more PT-RS received from the base station in the downlink in accordance with the resource mapping pattern for the PT-RS; and estimating a channel quality of a channel between the UE and the base station after the phase rotation is compensated based on the one or more PT-RS received from the base station.

Example 28 includes the UE of any of Examples 26 to 27, further comprising: means for decoding the resource mapping pattern for the PT-RS received from the base station via a higher layer signaling or a radio resource control (RRC) signaling; or decoding the resource mapping pattern for the PT-RS received from the base station via downlink control information (DCI), wherein the DCI includes one or more values to indicate different resource mapping patterns for the PT-RS.

Example 29 includes the UE of any of Examples 26 to 28, wherein: the resource mapping pattern for the PT-RS is based on one or more of: a modulation and coding scheme (MCS) utilized at the UE, an allocated bandwidth, a subcarrier spacing or a phase noise characteristic; or different resource mapping patterns for the PT-RS create different time and frequency densities of the PT-RS different resource mapping patterns for the PT-RS create different time and frequency densities of the PT-RS.

Example 30 includes the UE of any of Examples 26 to 29, wherein the PT-RS for one antenna port spans one subcarrier every N physical resource blocks (PRBs), wherein N is an integer that is semi-statically or dynamically adjusted according to a UE capability or a use case, wherein the use case is dependent on one or more of: a modulation and coding schemes (MCS), an allocated bandwidth or a subcarrier spacing.

Example 31 includes the UE of any of Examples 26 to 30, wherein the resource mapping pattern for the PT-RS is an adaptive pattern that is configured by the base station based on a presence of a phase noise limited scenario in the wireless network or a noise and carrier frequency offset (CFO) limited scenario in the wireless network, wherein the phase noise limited scenario indicates that phase noise is a dominant factor affecting the wireless network and the CFO limited scenario indicates that CFO is a dominant factor affecting the wireless network.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A user equipment (UE) operable to receive one or more phase tracking reference signals (PT-RS) from a base station in a wireless network, the UE comprising:
    one or more processors configured to:
        decode, at the UE, control signaling received in a downlink from the base station, wherein the control signaling indicates a resource mapping pattern for the one or more PT-RS;
        select, at the UE, the resource mapping pattern for the one or more PT-RS from a set of resource mapping patterns that are predefined at the UE, wherein the resource mapping pattern for the one or more PT-RS is selected based on the control signaling received from the base station; and
        receive, at the UE, the one or more PT-RS in accordance with the resource mapping pattern for the one or more PT-RS; and
    a memory interface configured to send to a memory the resource mapping pattern for the one or more PT-RS.

2. The UE of claim 1, wherein the set of resource mapping patterns is predefined at the UE via higher layer signaling.

3. The UE of claim 1, wherein the control signaling is received via downlink control information (DCI), wherein the DCI includes a value to indicate the resource mapping pattern for the PT-RS.

4. The UE of claim 1, wherein the resource mapping pattern for the one or more PT-RS is based on one or more of: a modulation and coding scheme (MCS) utilized at the UE, an allocated bandwidth, a subcarrier spacing and a phase noise characteristic.

5. The UE of claim 1, wherein a subcarrier offset of the resource mapping pattern of the one or more PT-RS is based on a cell identity (ID) or a virtual cell ID.

6. The UE of claim 1, wherein different resource mapping patterns of the set of resource mapping patterns correspond to different time and frequency densities for corresponding PT-RS.

7. The UE of claim 1, wherein the resource mapping pattern for the one or more PT-RS is for one antenna port and spans one subcarrier every N physical resource blocks (PRBs), wherein N is an integer that is semi-statically or dynamically adjusted according to one of a UE capability and a use case, and wherein the use case is dependent on one or more of: a modulation and coding schemes (MCS), an allocated bandwidth or a subcarrier spacing.

8. The UE of claim 1, wherein the resource mapping pattern for the one or more PT-RS is indicated according to an adaptive pattern method wherein the resource mapping pattern for the one or more PT-RS is indicated by the base station based on one of a presence of a phase noise limited scenario in the wireless network and a noise and carrier frequency offset (CFO) limited scenario in the wireless network, wherein the phase noise limited scenario indicates that phase noise is a dominant factor affecting the wireless network, and wherein the CFO limited scenario indicates that CFO is a dominant factor affecting the wireless network.

9. A method of a user equipment (UE) operable to receive one or more phase tracking reference signals (PT-RS) from a base station in a wireless network, the method comprising:
    decoding, at the UE, control signaling received in a downlink from the base station, wherein the control signaling indicates a resource mapping pattern for the one or more PT-RS;
    selecting, at the UE, the resource mapping pattern for the one or more PT-RS from a set of resource mapping patterns that are predefined at the UE, wherein the resource mapping pattern for the one or more PT-RS is selected based on the control signaling received from the base station; and
    receiving, at the UE, the one or more PT-RS in accordance with the resource mapping pattern for the one or more PT-RS.

10. The method of claim 9, wherein the set of resource mapping patterns is predefined at the UE via higher layer signaling.

11. The method of claim 9, wherein the control signaling is received via downlink control information (DCI), wherein the DCI includes a value to indicate the resource mapping pattern for the PT-RS.

12. The method of claim 9, wherein the resource mapping pattern for the one or more PT-RS is based on one or more of: a modulation and coding scheme (MCS) utilized at the UE, an allocated bandwidth, a subcarrier spacing and a phase noise characteristic.

13. The method of claim 9, wherein a subcarrier offset of the resource mapping pattern of the one or more PT-RS is based on a cell identity (ID) or a virtual cell ID.

14. The method of claim 9, wherein different resource mapping patterns of the set of resource mapping patterns correspond to different time and frequency densities for corresponding PT-RS.

15. The method of claim 9, wherein the resource mapping pattern for the one or more PT-RS is for one antenna port and spans one subcarrier every N physical resource blocks (PRBs), wherein N is an integer that is semi-statically or dynamically adjusted according to one of a UE capability and a use case, and wherein the use case is dependent on one or more of: a modulation and coding schemes (MCS), an allocated bandwidth or a subcarrier spacing.

16. The method of claim 9, wherein the resource mapping pattern for the one or more PT-RS is indicated according to an adaptive pattern method, wherein the resource mapping pattern for the one or more PT-RS is indicated by the base station based on one of a presence of a phase noise limited scenario in the wireless network and a noise and carrier frequency offset (CFO) limited scenario in the wireless network, wherein the phase noise limited scenario indicates that phase noise is a dominant factor affecting the wireless network, and wherein the CFO limited scenario indicates that CFO is a dominant factor affecting the wireless network.

* * * * *